(12) United States Patent
Huang

(10) Patent No.: US 7,644,227 B1
(45) Date of Patent: Jan. 5, 2010

(54) CIRCULATING FIRST-IN-FIRST-OUT BUFFER

(76) Inventor: Alan Huang, 682 Sixteenth Ave., Menlo Park, CA (US) 94025

( * ) Notice: Subject to any disclaimer, the term of this patent is extended or adjusted under 35 U.S.C. 154(b) by 400 days.

(21) Appl. No.: 11/756,526

(22) Filed: May 31, 2007

(51) Int. Cl.
*G06F 12/00* (2006.01)
(52) U.S. Cl. ..................................... 711/110
(58) Field of Classification Search ............... None
See application file for complete search history.

(56) References Cited

U.S. PATENT DOCUMENTS

| | | | |
|---|---|---|---|
| 5,144,375 A | 9/1992 | Gabriel et al. | |
| 5,146,517 A | 9/1992 | Avramopoulos et al. | |
| 5,155,779 A | 10/1992 | Avramopoulos et al. | |
| 5,208,705 A | 5/1993 | Avramopoulos et al. | |
| 5,369,520 A | 11/1994 | Avramopoulos et al. | |
| 5,442,474 A | 8/1995 | Huang et al. | |
| 6,567,094 B1 * | 5/2003 | Curry et al. | 345/558 |

OTHER PUBLICATIONS

Alan Huang, et. al., "Sagnac fiber logic gates and their possible applications: a system perspective," Applied Optics, vol. 33, No. 26, pp. 6254-6267, Sep. 19, 1994.

* cited by examiner

*Primary Examiner*—Hiep T Nguyen

(57) ABSTRACT

A circulating first-in-first-out (FIFO) buffer with a downstream input and output, an upstream input and output, a circulating staging and staging marker and output marker storage with the same storage capacity; a circulating primary, begin marker, and end marker storage with the same storage capacity; and a control means where the primary, begin marker, and end marker storage are used to implement a circulating FIFO where the control means manages the transfer of data from the downstream input to the staging storage, manages the FIFO, enqueues the data from the staging storage to the FIFO, and dequeues data from the FIFO to upstream output; where the input is decoupled from the circulating FIFO; where the input is decoupled from the output; and where the circulating staging storage, circulating primary storage, and control means are all either analog electronic, digital electronic, or optical.

20 Claims, 25 Drawing Sheets

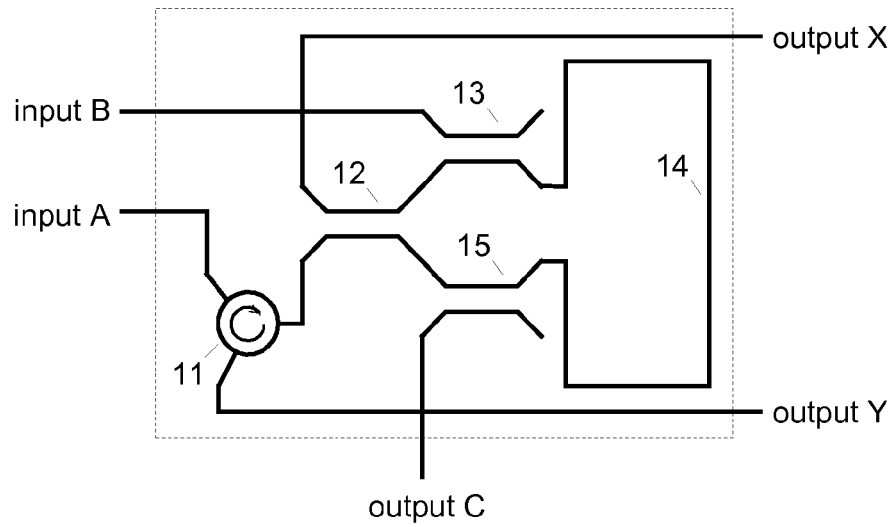
Fig. 1 (prior art)
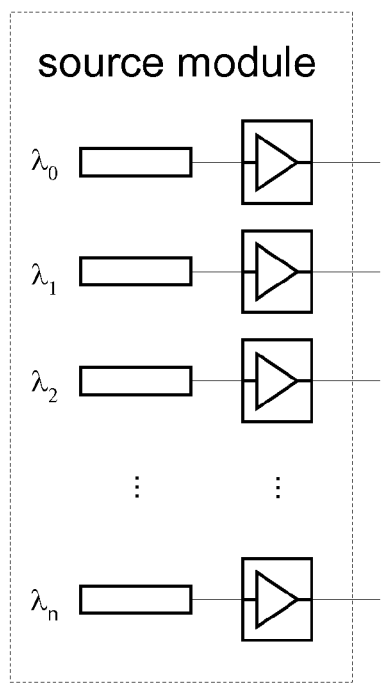
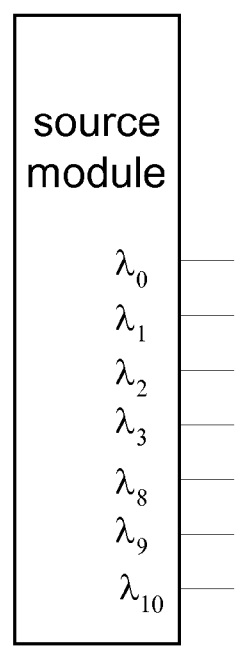
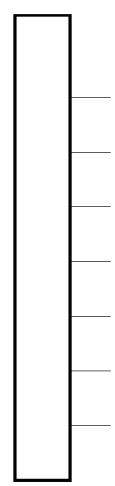
Fig. 2A
(prior art)
Fig. 2B
(prior art)
Fig. 2C
(prior art)

Fig. 3A (prior art)
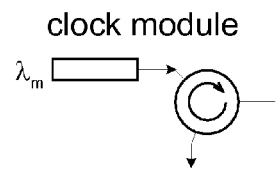
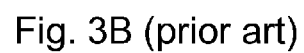
Fig. 3B (prior art)
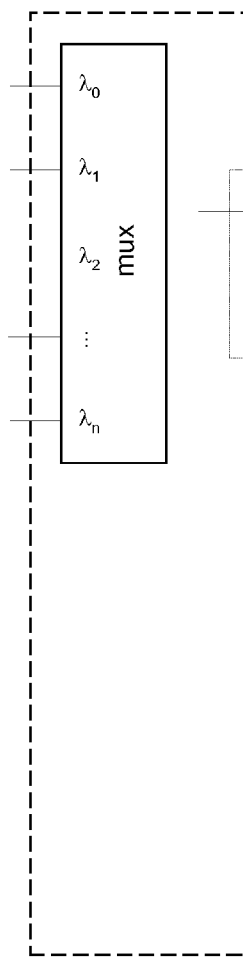
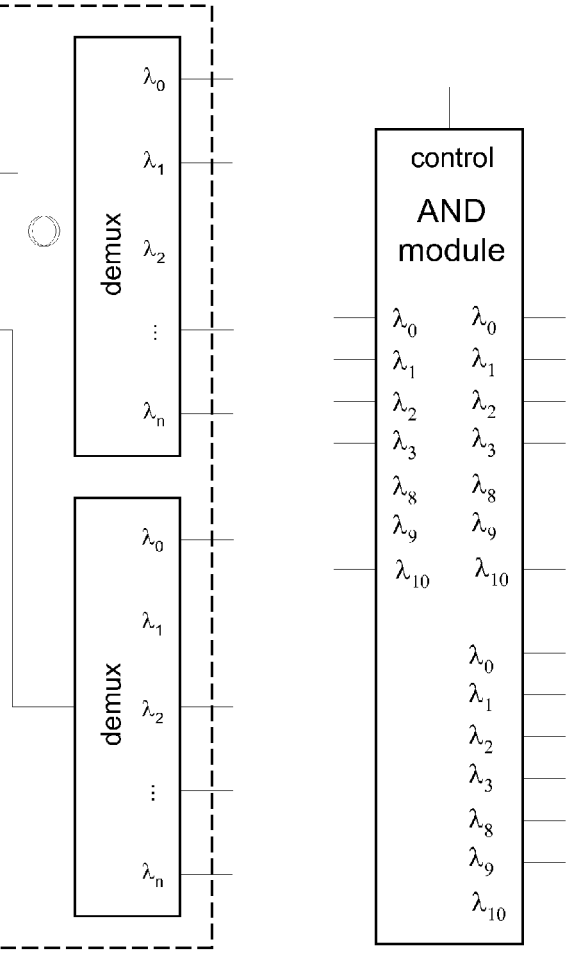
Fig. 4A (prior art)
Fig. 4B (prior art)

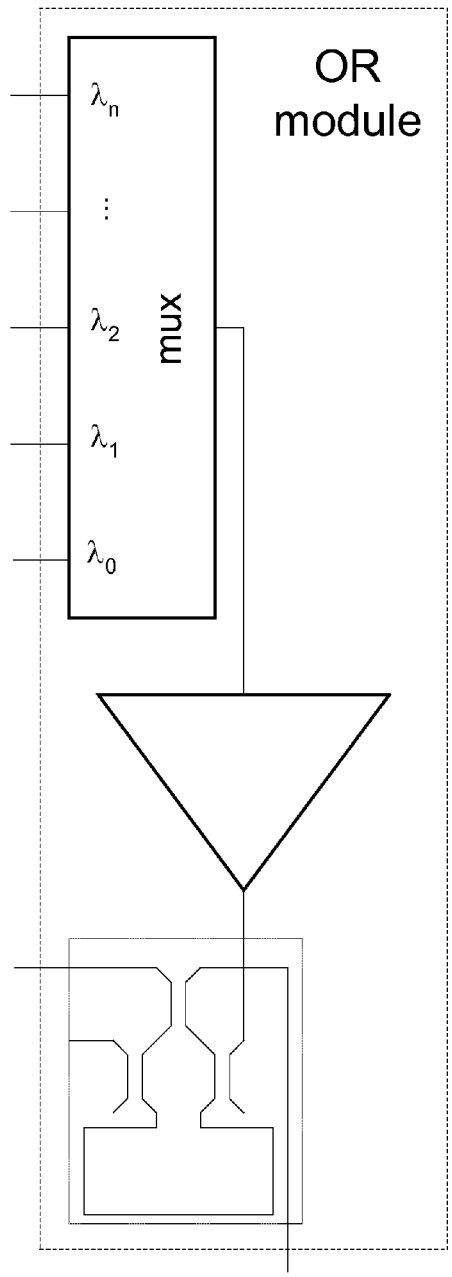
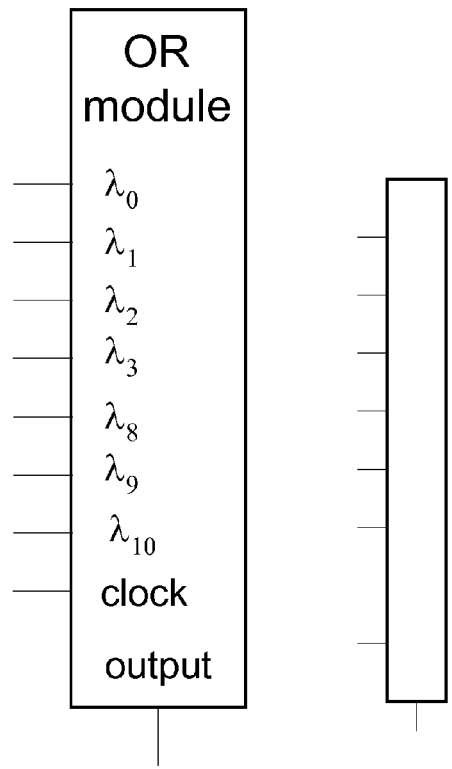
Fig. 5A
(prior art)
Fig. 5B
(prior art)
Fig. 5C
(prior art)

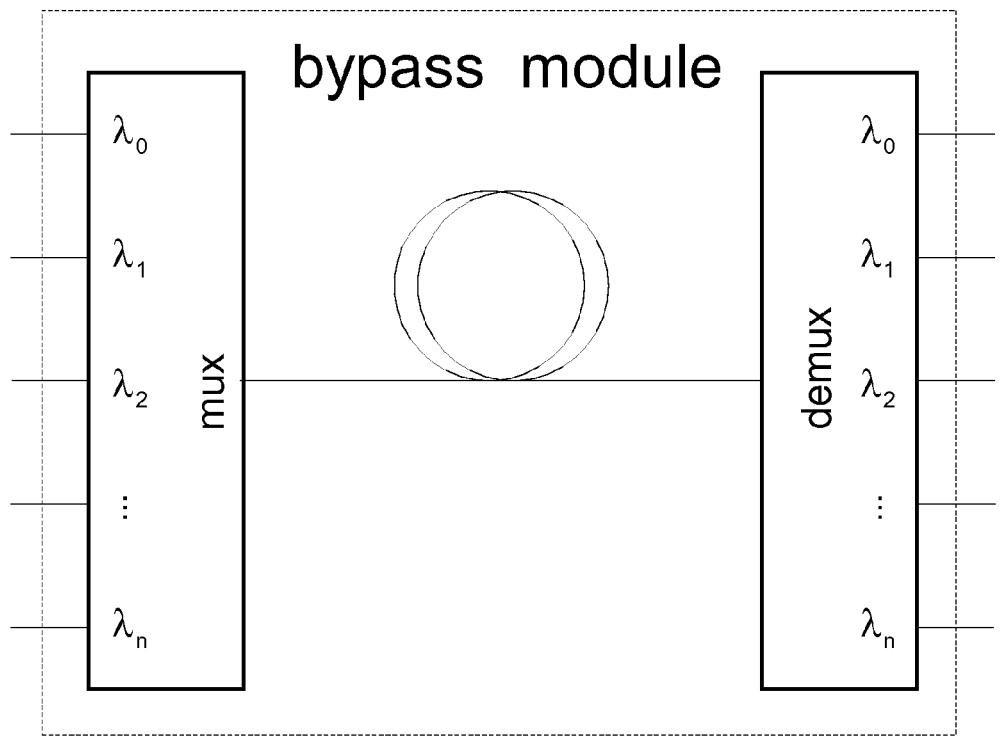
Fig. 6A (prior art)
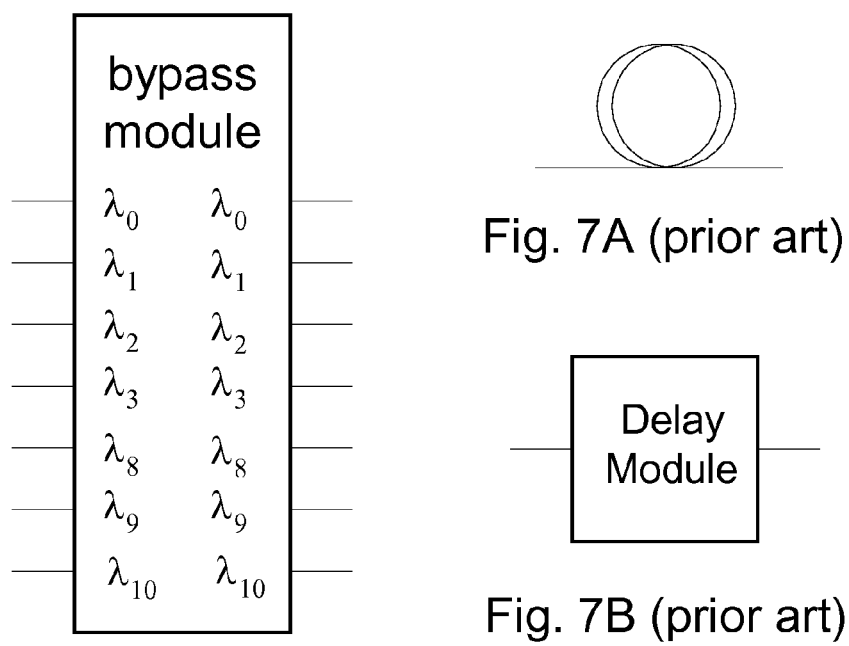
Fig. 6B (prior art)
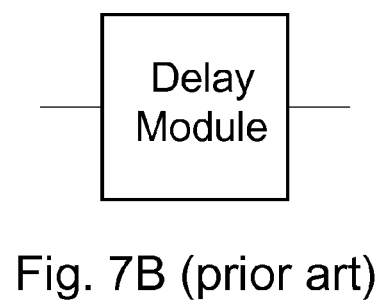
Fig. 7A (prior art)
Fig. 7B (prior art)

| State Assignment ||
|---|---|
| A | 000 |
| B | 001 |
| C | 011 |
| D | 010 |
| E | 110 |
| F | 111 |
| G | 101 |
| H | 100 |

Fig. 14

| m.i | s.i | sb.i | se.i | b.i | d.R | Current | Next | S2 | S1 | S0 | m.o | s.o | sb.o | se.o | b.o | d T | comment |
|---|---|---|---|---|---|---|---|---|---|---|---|---|---|---|---|---|---|
| X | X | X | X | X | X | A | B | 0 | 0 | 1 | 0 | 0 | 1 | 1 | 0 | 0 | initialize |
| X | 1 | X | X | X | 0 | B | B | 0 | 0 | 1 | 0 | 1 | 0 | 0 | 0 | 0 | Wait RTS |
| X | X | X | 1 | X | 0 | B | B | 0 | 0 | 1 | 0 | 0 | 0 | 1 | 0 | 0 | Wait RTS |
| X | 0 | X | X | X | 1 | B | C | 0 | 1 | 1 | 0 | 0 | 0 | 0 | 0 | 1 | Send CTS |
| X | 1 | X | X | X | 1 | B | C | 0 | 1 | 1 | 0 | 1 | 0 | 0 | 0 | 1 | Send CTS |
| X | X | X | 0 | X | 1 | B | C | 0 | 1 | 1 | 0 | 0 | 0 | 0 | 0 | 1 | Send CTS |
| X | X | X | 1 | X | 1 | B | C | 0 | 1 | 1 | 0 | 0 | 0 | 1 | 0 | 0 | Send CTS |
| X | 1 | X | X | X | 0 | C | C | 0 | 1 | 1 | 0 | 1 | 0 | 0 | 0 | 0 | Wait Start |
| X | X | X | 1 | X | 0 | C | C | 0 | 1 | 1 | 0 | 0 | 0 | 1 | 0 | 0 | Wait Start |
| X | 0 | X | X | X | 1 | C | D | 0 | 1 | 0 | 1 | 0 | 0 | 0 | 0 | 0 | Begin Input |
| X | 1 | X | X | X | 1 | C | D | 0 | 1 | 0 | 1 | 1 | 0 | 0 | 0 | 0 | Begin Input |
| X | X | X | 0 | X | 1 | C | D | 0 | 1 | 0 | 1 | 0 | 0 | 0 | 0 | 0 | Begin Input |
| X | X | X | 1 | X | 1 | C | D | 0 | 1 | 0 | 1 | 0 | 0 | 1 | 0 | 0 | Begin Input |
| 0 | X | X | X | X | 1 | D | D | 0 | 1 | 0 | 0 | 0 | 0 | 0 | 1 | 0 | Input |
| 0 | 1 | X | X | X | X | D | D | 0 | 1 | 0 | 0 | 1 | 0 | 0 | 0 | 0 | Input |
| 0 | X | X | 1 | X | X | D | D | 0 | 1 | 0 | 0 | 0 | 0 | 1 | 0 | 0 | Input |
| 1 | 1 | X | X | X | X | D | E | 1 | 1 | 0 | 0 | 1 | 0 | 0 | 0 | 0 | End Input |
| 1 | 1 | X | X | X | X | D | E | 1 | 1 | 0 | 0 | 1 | 0 | 1 | 0 | 0 | End Input |
| X | X | X | 0 | 1 | X | E | E | 1 | 1 | 0 | 0 | 0 | 0 | 0 | 1 | 0 | Wait End |
| X | X | X | 0 | X | X | E | E | 1 | 1 | 0 | 0 | 1 | 0 | 0 | 0 | 0 | Wait End |
| X | X | X | 1 | 0 | X | E | F | 1 | 1 | 1 | 1 | 0 | 0 | 0 | 0 | 0 | Test Full |
| X | X | X | 1 | 1 | X | E | F | 1 | 1 | 1 | 1 | 0 | 0 | 0 | 1 | 0 | Test Full |
| X | 0 | X | 1 | X | X | E | F | 1 | 1 | 1 | 1 | 0 | 0 | 0 | 0 | 0 | Test Full |
| X | 1 | X | 1 | X | X | E | F | 1 | 1 | 1 | 1 | 1 | 0 | 0 | 0 | 0 | Test Full |
| X | X | 1 | X | 1 | X | F | E | 1 | 1 | 0 | 0 | 0 | 0 | 0 | 1 | 0 | Full |
| X | 1 | 1 | X | X | X | F | E | 1 | 1 | 0 | 0 | 1 | 0 | 0 | 0 | 0 | Full |
| 0 | X | 0 | X | 1 | X | F | F | 1 | 1 | 1 | 0 | 0 | 0 | 0 | 1 | 0 | Full |
| 0 | 1 | 0 | X | X | X | F | F | 1 | 1 | 1 | 0 | 1 | 0 | 0 | 0 | 0 | Full |
| 1 | X | X | X | 1 | X | F | G | 1 | 0 | 1 | 0 | 0 | 0 | 0 | 1 | 0 | Not Full |
| 1 | 1 | X | X | X | X | F | G | 1 | 0 | 1 | 0 | 1 | 0 | 0 | 0 | 0 | Not Full |
| X | X | X | 0 | 1 | X | G | G | 1 | 0 | 1 | 0 | 0 | 0 | 0 | 1 | 0 | Wait End |
| X | 1 | X | 0 | X | X | G | G | 1 | 0 | 1 | 0 | 1 | 0 | 0 | 0 | 0 | Wait End |
| X | X | X | 1 | X | X | G | H | 1 | 0 | 0 | 1 | 0 | 0 | 0 | 0 | 0 | Start append |
| 0 | X | X | X | 1 | X | H | H | 1 | 0 | 0 | 0 | 1 | 0 | 0 | 0 | 0 | Wait End Append |
| 1 | X | X | X | X | X | H | B | 0 | 0 | 1 | 0 | 0 | 0 | 1 | 0 | 0 | End Append |

Fig. 15

| mm.i | s.i | sb.i | se.i | u.R | Current State | Next State | SS1 | SS0 | mm.o | sb.o | u.T | comment |
|---|---|---|---|---|---|---|---|---|---|---|---|---|
| X | X | 1 | 1 | X | A | A | 0 | 0 | 0 | 1 | 0 | Wait non-empty |
| X | X | 1 | 0 | X | A | B | 0 | 1 | 0 | 1 | 1 | Non-empty & RTS |
| X | X | 0 | 1 | X | A | B | 0 | 1 | 0 | 0 | 1 | Non-empty & RTS |
| X | X | 1 | X | 0 | B | B | 0 | 1 | 0 | 1 | 0 | Wait CTS |
| X | X | 1 | X | 1 | B | C | 1 | 1 | 0 | 1 | 0 | CTS |
| X | X | 1 | X | X | C | C | 1 | 1 | 0 | 0 | 0 | Wait Begin |
| X | X | 1 | 0 | X | C | D | 1 | 0 | 1 | 0 | 1 | Start output |
| 0 | 1 | X | X | X | D | D | 1 | 0 | 0 | 0 | 1 | Wait End |
| 1 | X | X | X | X | D | A | 0 | 0 | 0 | 1 | 0 | End output |

Fig. 19

CIRCULATING FIRST-IN-FIRST-OUT BUFFER

CROSS-REFERENCE TO RELATED APPLICATIONS

This application uses the wave pipelined, multi-threaded optical state machine disclosed in my patent application Ser. No. 11/539,370 filed on Oct. 6, 2006 and is related to the optical FIFO packet buffer element disclosed in my patent application Ser. No. 11/685,560 filed on Mar. 13, 2007.

BACKGROUND OF THE INVENTION

1. Field of Invention

This invention relates to ultrafast first-in first-out (FIFO) optical buffers for optical communication networks.

2. Prior Art

One of the drawbacks with optical digital technology has been the absence of a random access optical memory element. One approach around this problem has been the use of optical delays.

There are several problems with using optical delays. One problem has been the slow electronic switching of the optical packets in and out of the delay lines. Another problem is that when more delay lines are used, the more difficult it becomes to keep the packets in the same order.

Optical digital storage loops have been demonstrated. One problem is how to organize the circulating storage into useful data structure. Another problem is how to synchronize the input data with such a circulating data structure.

SUMMARY

Lengths of optical fiber; an optical circulator, polarization maintaining splitter, two polarization selective couplers, and a length of polarization preserving optical fiber; and a polarization maintaining splitter, two polarization selective couplers, and a length of polarization preserving optical fiber; are used to implement optical delays; a polarization based Sagnac switch (also know as a nonlinear loop mirror); and a modified polarization based Sagnac switch. Different wavelength lasers and optical isolators; high rep-rate short, pulse laser and optical circulator; a wavelength multiplexer, a Sagnac switch, an optical delay, and two optical wavelength demultiplexers; a wavelength multiplexer, optical delay, and wavelength demultiplexer; an optical wavelength multiplexer, optical amplifier, and a modified Sagnac switch; a plurality of optical delays; and a plurality of optical delays are used to implement a multiple wavelength optical source module, an optical clock module, AND module with a control input, complemented output, and non-complemented output; a Bypass module; an OR module; a pipeline delay module; and a supplemental feedback delay module that are used to implement an optical state machine.

Loops of optical fiber are used as circulating storage loops. An optical state machine is used to manage a circulating staging loop and a circulating primary storage loop. The circulating staging loop is organized as a circular loop with X bits of capacity. The circulating primary storage loop is organized as a circular first-in-first-out (FIFO) queue with a begin (head) and an end (tail) and with a plurality of elements each capable of storing X bits. The state machine manages the loading of the circulating staging loop; the enqueuing of X bits from the staging loop to the end of the FIFO queue; and the dequeuing X bits from the begin of the FIFO queue, and outputting the dequeued bits. The X bits loaded into the staging loop and out of the primary loop are assumed to be a circular buffer with a data structure with an embedded begin (head) and an end (tail) symbol. The embedded begin and end symbols avoid the need to synchronize the input with the circulating staging loop. The staging loop avoids the need to synchronize the input with the circulating FIFO queue. The embedded begin and end symbols avoid the need to synchronize the contents of the circulating staging loop with the circulating FIFO queue. The embedded begin and end symbols avoid the need to synchronize the contents of the circulating FIFO queue with the output.

The input state machine is comprised of a downstream input, a downstream output, a staging loop, a staging marker loop, a primary storage loop, a storage begin marker loop, a storage end marker loop, an output marker loop, and a set of state bits.

The output state machine is comprised of an upstream input, an upstream output, the primary storage loop which is shared with the input state machine, the storage begin (or head) marker loop which is shared with the input state machine, the storage end (or tail) marker loop which is shared with the input state machine, an output marker loop, and a set of state bit loops.

The storage capacity of the staging loop, staging marker loop, and output marker loop are identical. The storage capacity of the primary storage loop, the storage begin marker loop, and the storage end marker loop are identical. The storage capacity of the input state machine state bit loops and the output state machine state bits are identical. The storage capacity of the primary storage loop is greater than the storage capacity of the staging loop.

The input and output state machines operate independently allowing the input and output of the circular buffer to function independently. The input and state machines share read privileges to the primary storage loop, storage begin marker loop, and storage end marker loop. The input state machine has write privileges to the primary storage loop, storage begin marker loop, and the storage end marker loop. The output state machine has read and write privileges to the storage begin marker loop. The only time that the input state machine writes to the storage begin marker loop is during the simultaneous initialization of the input and output state machines.

The input state machine is comprised of States A through H. State A is the start state. State A transitions to State B and establishes a begin (head) marker in the storage begin marker loop and an end (tail) marker in the storage end marker loop. State B waits for a downstream request-to-send (RTS), maintains the contents of the primary storage loop, and maintains the contents of the storage end marker loop. Upon receiving a RTS, State A transitions to State C and sends a downstream clear-to-send (CTS), maintains the contents of the primary storage loop, and maintains the contents of the storage end marker loop. State C waits for a downstream begin-data bit, maintains the contents of the primary storage loop, and maintains the contents of the storage end marker loop. Upon receiving a downstream begin-data bit, State C transitions to State D sets the staging marker, maintains the contents of the primary storage loop, and maintains the contents of the storage end marker loop. State D loads the staging storage loop, waits for the staging marker to indicate the end of the input, maintains the contents of the primary storage loop, and maintains the contents of the storage end marker loop. Upon detecting the staging marker, State D transitions to State E, maintains the contents of the primary storage loop, and maintains the contents of the storage end marker loop. State E waits for the storage loop end marker, maintains the contents of the staging loop, and maintains the contents of the primary storage loop. Upon detecting the storage loop end marker, State E transitions to State F, sets the staging marker to test if there is sufficient room in the primary storage loop to save the contents of the staging loop, maintains the contents of the staging loop, and maintains the contents of the primary storage loop. State F tests if the primary storage loop has sufficient room to store the contents of the staging loop by waiting for either the staging marker or storage begin marker to appear, maintaining the contents of the staging loop, and maintaining the contents of the primary storage loop. Upon detecting the storage begin marker indicating that the primary storage loop is full, State F transitions to State E, maintains the contents of the staging loop, and maintains the contents of the primary storage loop. Upon detecting the staging marker indicating that the primary storage loop is not full, State F transitions to State G, maintains the contents of the staging loop, and maintains the contents of the primary storage loop. State G waits for the storage end marker, maintains the contents of the staging loop, and maintains the contents of the primary storage loop. Upon detecting the storage end marker State G transitions to State H, inserts a begin-data bit into the primary storage loop, and sets the staging loop marker. State H waits for the staging loop marker and transfers the contents of the staging loop to the primary storage loop. Upon detecting the staging timing marker State H transitions to State B, sets the storage end (tail) marker, and maintains the contents of the primary storage loop.

The output state machine is comprised of States A through D. State A is the start state. State A waits if the primary storage loop is empty and maintains the contents of the storage begin loop. Upon detecting that the primary storage loop is non-empty, State A transitions to State B; transmits a request-to-send (RTS) and maintains the contents of the storage begin loop. State B waits for a clear-to-send (CTS) and maintains the contents of the storage begin loop. Upon receiving a clear-to-send, State B transitions to State C and maintains the contents of the storage begin marker loop. State C waits for the storage begin (head) marker and maintains the contents of the storage begin marker loop. Upon detecting the storage begin marker, State C transitions to State D; sets the output marker and sending an upstream begin-of-data bit. State D waits for the end of the data transfer by monitoring the output marker and transferring the contents of the primary storage loop to the upstream transmit output. Upon detecting the output marker, State D transitions to State A and sets the storage begin (head) marker.

DRAWINGS

Figures

FIG. 1 (prior art) shows a Sagnac switch implemented with an optical circulator (11), a 50/50 splitter, an input coupler (13), a length of optical fiber (14), and an input dump coupler (15).

FIG. 2A (prior art) shows a multiple wavelength Laser Source module.

FIG. 2B (prior art) shows the schematic representation for a multiple wavelength Laser Source module.

FIG. 2C (prior art) shows a compact schematic representation for a multiple wavelength Laser Source module.

FIG. 3A (prior art) shows a Optical (or Laser) Clock module with an optical isolator.

FIG. 3B (prior art) shows the schematic representation for a Optical Clock module.

FIG. 4A (prior art) shows a multiple wavelength optical AND Module implemented with an array waveguide grating multiplexer, a Sagnac switch, two array waveguide grating demultiplexers, and an optical delay.

FIG. 4B (prior art) shows the schematic representation for a multiple wavelength optical AND module.

FIG. 5A (prior art) shows a multiple wavelength optical OR module implemented with an array waveguide grating (AWG) multiplexer, an optical amplifier, and a Sagnac switch.

FIG. 5B (prior art) shows the schematic representation for a multiple wavelength optical OR module.

FIG. 5C (prior art) shows a compact schematic representation for a multiple wavelength optical OR module.

FIG. 6A (prior art) shows a multiple wavelength optical Bypass module implemented with an array waveguide grating (AWG) multiplexer, optical delay line, and an array waveguide grating (AWG) demultiplexer.

FIG. 6B (prior art) shows the schematic representation for a multiple wavelength optical Bypass module.

FIG. 7A (prior art) shows a multiple wavelength optical Delay module implemented with a length of optical fiber.

FIG. 7B (prior art) shows the schematic representation for a multiple wavelength optical Delay module.

FIG. 14 shows the state assignments for the state diagram shown in FIG. 13.

FIG. 15 shows the state transition table for the state diagram shown in FIG. 13.

FIG. 19 shows the state transition table for the state transition diagram shown in FIG. 17.

DETAILED DESCRIPTION

Figure 8A:
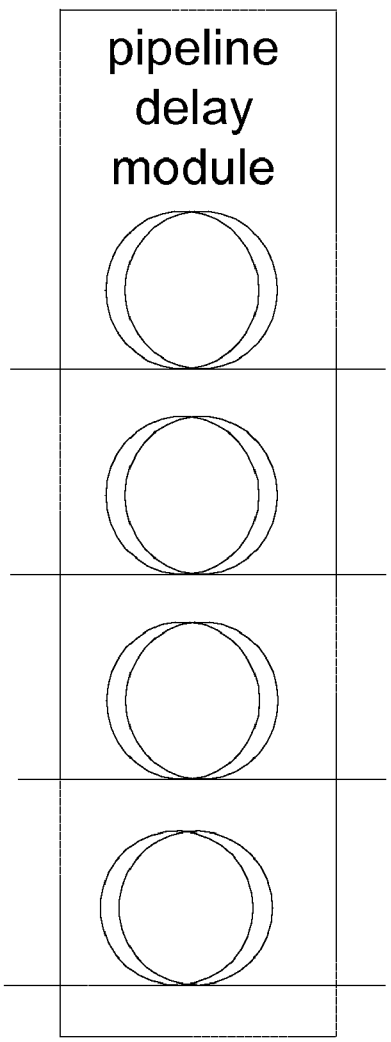
FIG. 8A (prior art) shows an optical Pipeline Delay module implemented with multiple wavelength optical Delay modules.

Optical isolators, optical circulators, 50/50 splitters, optical couplers, lengths of optical fiber, continuous wave lasers, pulsed lasers, wavelength multiplexers, wavelength demultiplexers, optical attenuator, and optical amplifiers are used to implement a source module, a clock module, a Sagnac switch module, a modified Sagnac Switch module, an AND module, an OR module, a Bypass module, a Pipeline Delay module, and a Supplemental Feedback Delay module that are used to implement wave pipelined, multi-threaded optical state machines that are used to implement the first-in first-out (FIFO) packet buffer elements.

A Sagnac switch 10 is shown in FIG. 1 (prior art). Input A of the Sagnac switch is connected to the slow axis of polarization of the first port of clockwise optical circulator 11. The slow axis of polarization of the second (clockwise) port of optical circulator 11 is connected to the slow axis of polarization of the first port of the first end of polarization maintaining 50/50 splitter 12. The slow axis of polarization of the second port of the second end of splitter 12 is connected to the slow axis of polarization of the first port of the first end of polarization selective optical coupler 13. The slow and fast axis's of polarization of the first port of the second end of coupler 13 are connected to the slow and fast axis's of polarization of the first end of the polarization maintaining optical fiber loop 14. The slow and fast axis of polarization of the second end of optical fiber loop 14 are connected to the slow and fast axis of polarization of the second port of the second end of polarization selective optical coupler 15. The slow axis of polarization of the second port of the first end of polarization selective optical coupler 15 is connected to the slow axis of polarization of the first port of the second end of splitter 12. Input B is connected to the fast axis of polarization of the second port of the first end of coupler 13. The fast axis of polarization of the first port of the first end of coupler 15 is connected to output C. The slow axis of polarization of the second port of the first end of splitter 12 is connected to output X. The slow axis of polarization of the third port of optical circulator 11 is connected to output Y.

The circuit diagram for a Multiple Wavelength Optical Source module is shown in FIG. 2A (prior art). The module is comprised of a plurality of continuous wave lasers each with a different wavelength each connected to an optical isolator. The schematic representation for the module is shown in FIG. 2B (prior art).

The circuit diagram for an Optical Clock module is shown in FIG. 3A (prior art). The module is comprised of a mode-locked, high repetition rate laser connected to an optical isolator. The schematic representation for the module is shown in FIG. 3B (prior art).

The circuit diagram for an optical AND module is shown in FIG. 4A (prior art). The module is comprised of a wavelength demultiplexer, a Sagnac switch, an optical delay, and two wavelength demultiplexers. The schematic representation for the module is shown in FIG. 4B (prior art).

The circuit diagram for an optical OR module is shown in FIG. 5A (prior art). The module is comprised of a wavelength multiplexer, and optical amplifier, and Sagnac switch. The schematic representation for the module is shown in FIG. 5B (prior art).

The circuit diagram for an optical Bypass module is shown in FIG. 6A (prior art). The module is comprised of a wavelength multiplexer, optical delay, and wavelength demultiplexer. The schematic representation for the module is shown in FIG. 6B (prior art).

The circuit diagram for an optical Delay module is shown in FIG. 7A (prior art). The module is comprised of a length of optical fiber. The schematic representation for the module is shown in FIG. 7B (prior art).

Figure 8B:
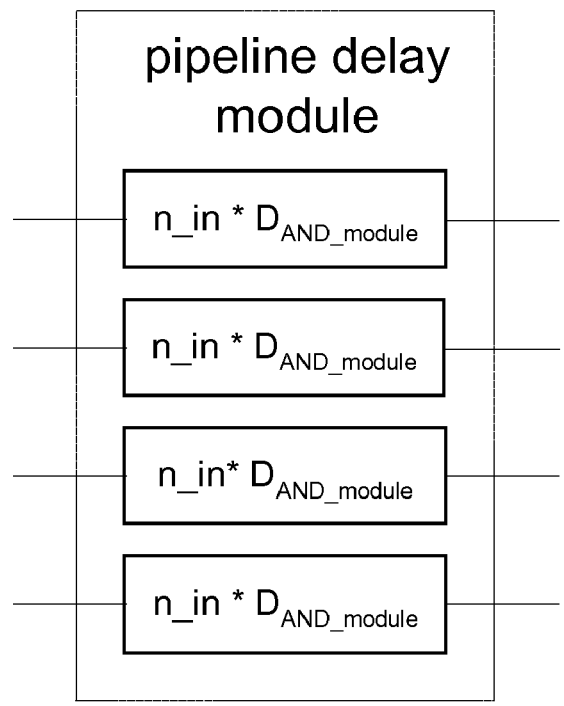
FIG. 8B (prior art) shows the schematic representation for an optical Pipeline Delay module.

The circuit diagram for an optical pipeline delay module is shown in FIG. 8A (prior art). The module is comprised of a plurality of optical delays modules. The schematic representation for the module is shown in FIG. 8B (prior art).

Figure 9A:
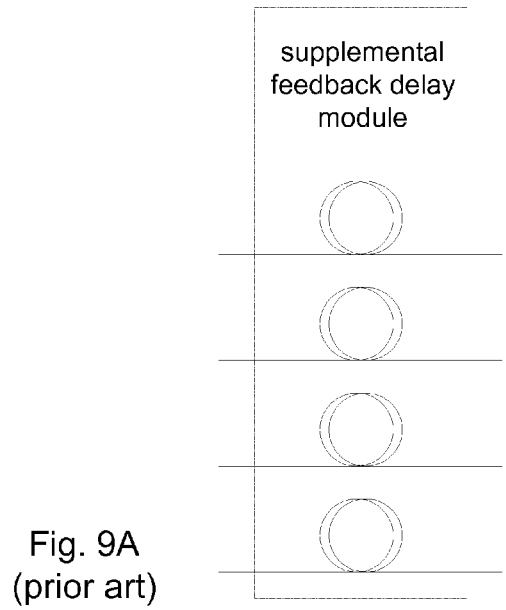
FIG. 9A (prior art) show a Supplemental Feedback Delay (SFD) module implemented with optical Delay modules.
Figure 9B:
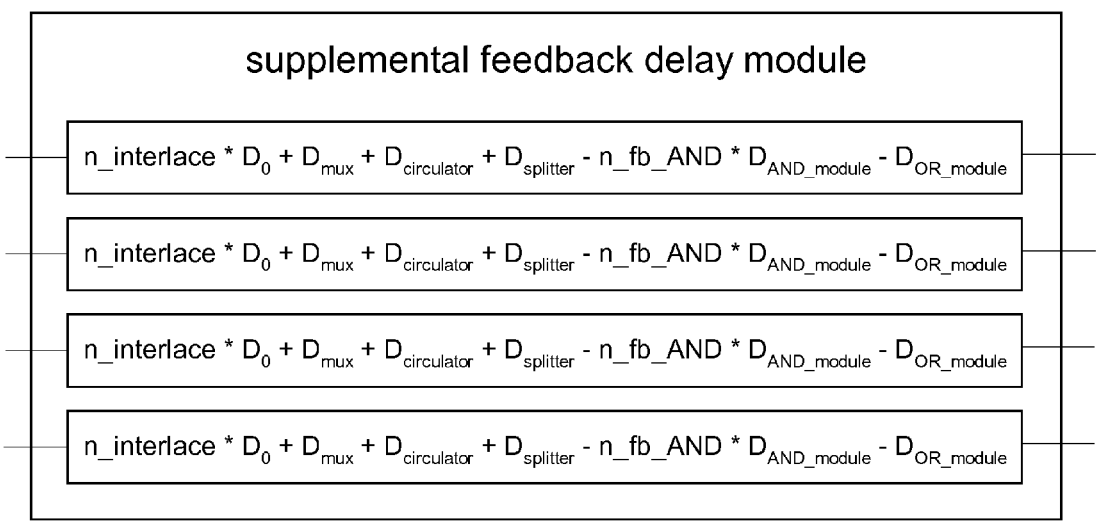
FIG. 9B (prior art) shows the schematic representation for a Supplemental Feedback Delay (SFD) module.

The circuit diagram for an optical Supplemental Feedback Delay module is shown in FIG. 9A (prior art). The module is comprised of a plurality of optical delay modules. The schematic representation for the module is shown in FIG. 9B (prior art).

The multiple wavelength optical source, optical clock, AND, OR, Bypass, Delay, Pipeline Delay, Supplemental Feedback Delay modules are discussed in the cross-referenced patent application.

Figure 10A:
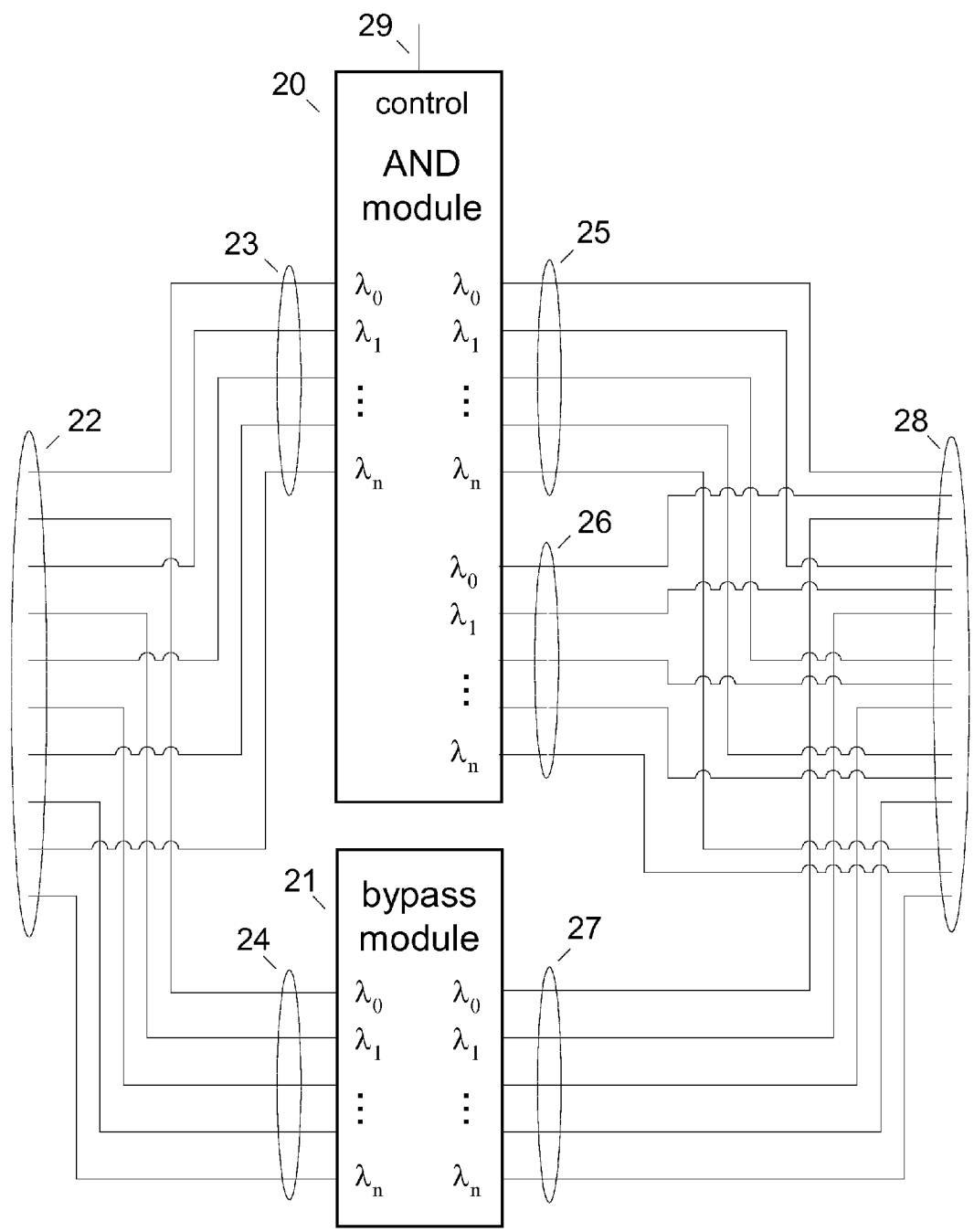
FIG. 10A shows a multiple wavelength optical AND module grouped with an optical Bypass module with their inputs interlaced and their outputs interlaced.
Figures 10B, 10C:
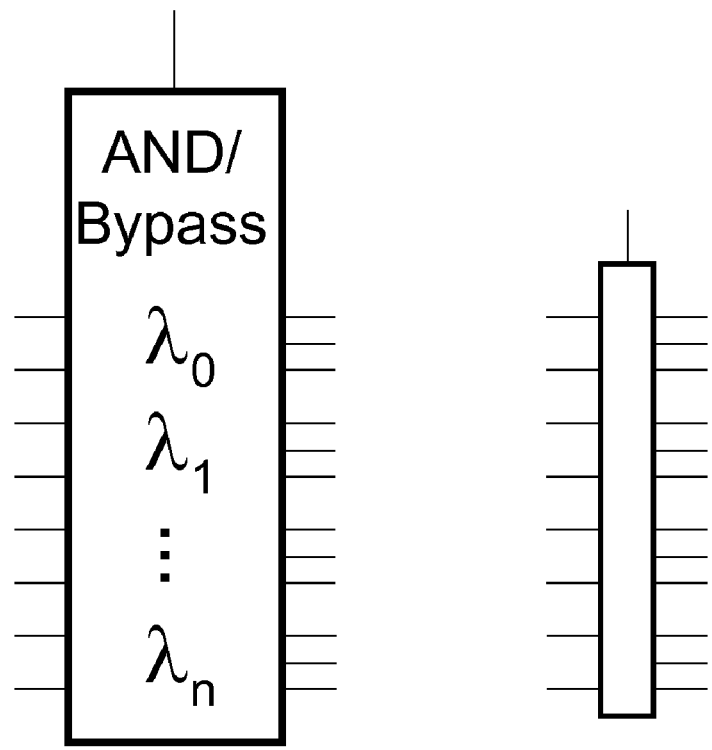
FIG. 10B shows the schematic representation for a grouped AND and Bypass (AND/Bypass) module.
FIG. 10C shows a compact schematic representation for a grouped AND and Bypass (AND/Bypass) module.

An optical AND module 20 and Bypass module 21 are shown in FIG. 10A. Inputs 22 are de-interlaced into inputs 23 of AND module 20 and inputs 24 of Bypass module 21. Input 29 is the control input for AND module 20. Non-complemented outputs 25 of AND module 20, complemented outputs 26, and outputs 27 of Bypass module 21 are three-way interlaced to form outputs 28. A more compact schematic representation for this AND/Bypass sub-circuit is shown in FIG. 10B. Input connections 30 in FIG. 10B correspond to input connections 20 in FIG. 10A. Output connections 32 in FIG. 10B correspond to output connections 28 in FIG. 10A. Control input connection 31 in FIG. 10B corresponds to control input connection 29 in FIG. 10A. The midterm input is mt, the bypass input is bi, the non-complemented output is nc, and the complemented output is c, the bypass output is bo.

Figure 11:
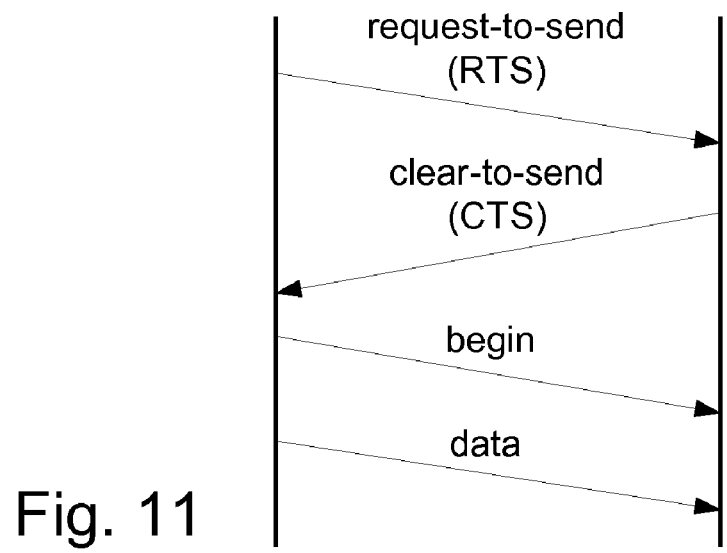
FIG. 11 shows a protocol between the sender and the receiver in which the sender sends a request-to-send (RTS), the receiver responds with a clear-to-send (CTS), and the sender sends a begin-of-data bit followed by the data.

An asynchronous data transfer protocol or handshake between a sender and a receiver is shown in FIG. 11. The sender sends a request-to-send (RTS), the receiver responds with a clear-to-send (CTS), and the sender sends a begin-of-data bit followed by the data. Separate state machines are used to control the input and output to decouple the input from the output.

Figure 12:
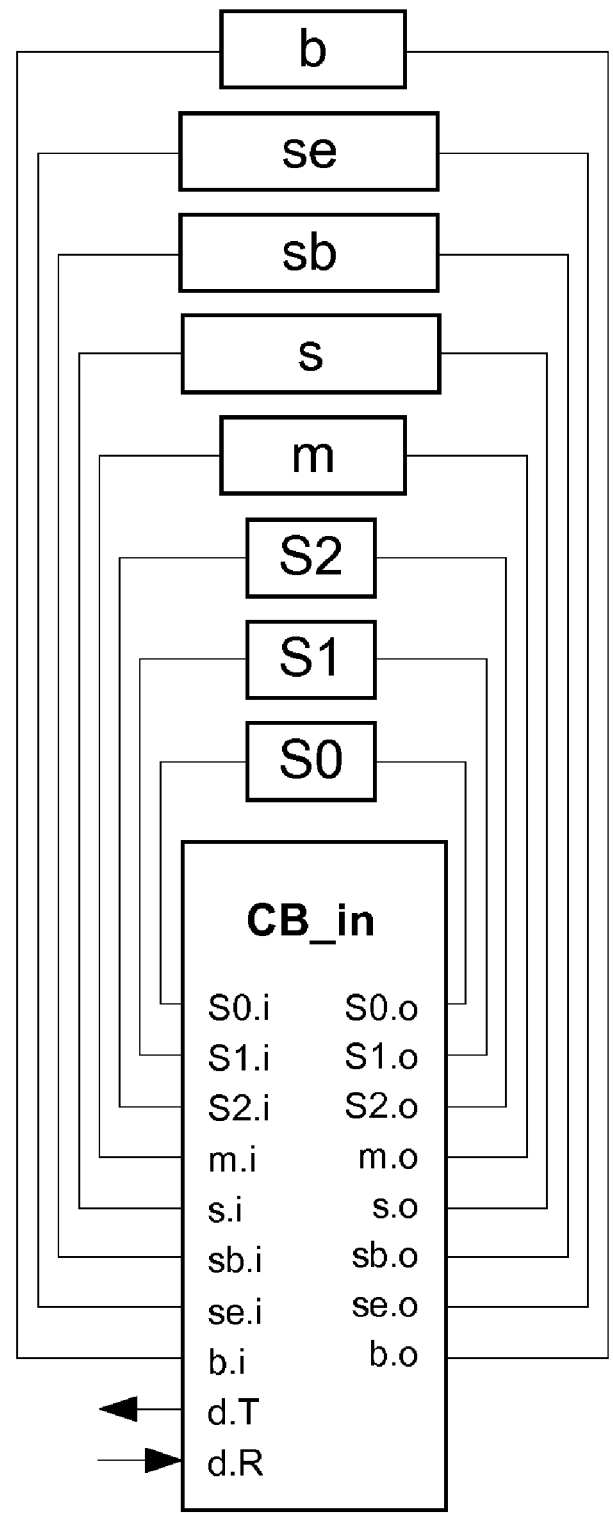
FIG. 12 shows a state machine that handles the input handshake, primary staging loop b, the staging marker loop m, the primary storage loop s, and the storage end marker loop se.

The Circulating FIFO buffer input and storage state machine that handles the input handshake, staging loop, the staging marker loop, the primary storage loop, and the primary storage end marker loop is shown in FIG. 12. The storage elements of the state machine are comprised of state bit S0, state bit S1, state bit S2, staging loop b, staging marker loop m, storage loop s, storage begin marker loop sb, and storage loop end marker loop se. The inputs of the combinatoric logic section of the state machine are comprised of state bit S0 input, S0.$i$; state bit S1 input, S1.1; state bit S2 input, S2.$i$; staging marker loop input, m.$i$; storage loop input, s.$i$; storage begin marker loop input, sb.$i$; storage end marker loop input, se.i; staging loop input, b.i; and downstream receive input, d.R. The outputs of the combinatoric logic section are comprised of state bit S0 output, S0.o; state bit S1 output, S1.o; state bit S2 output, S2.o; staging loop output, m.o; primary storage loop output, s.o; storage begin marker output, sb.o; storage end marker output, se.o; staging loop output, b.o; and downstream transmit output, d.T.

Figure 13:
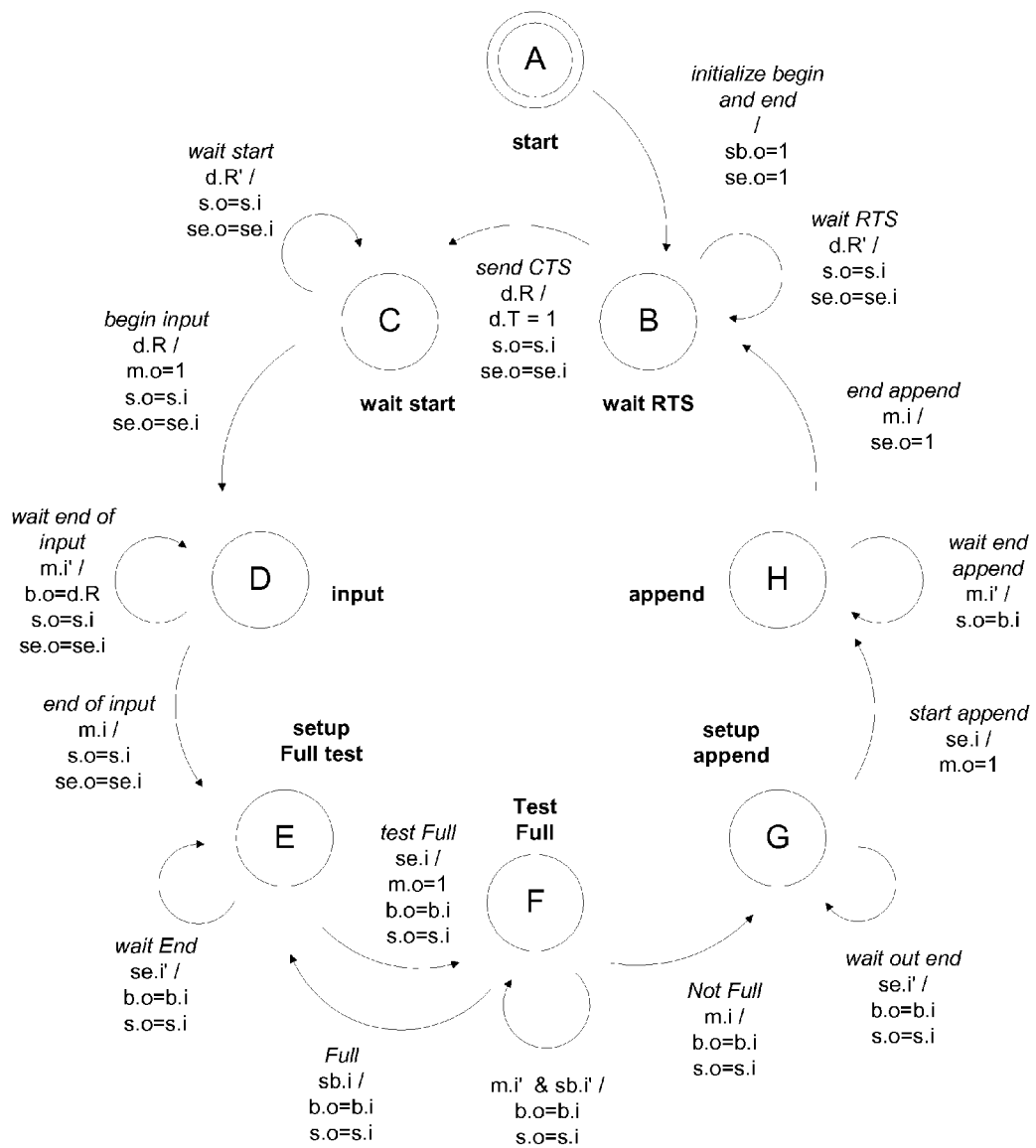
FIG. 13 shows the state diagram for the state machine shown in FIG. 12.
Figure 16:
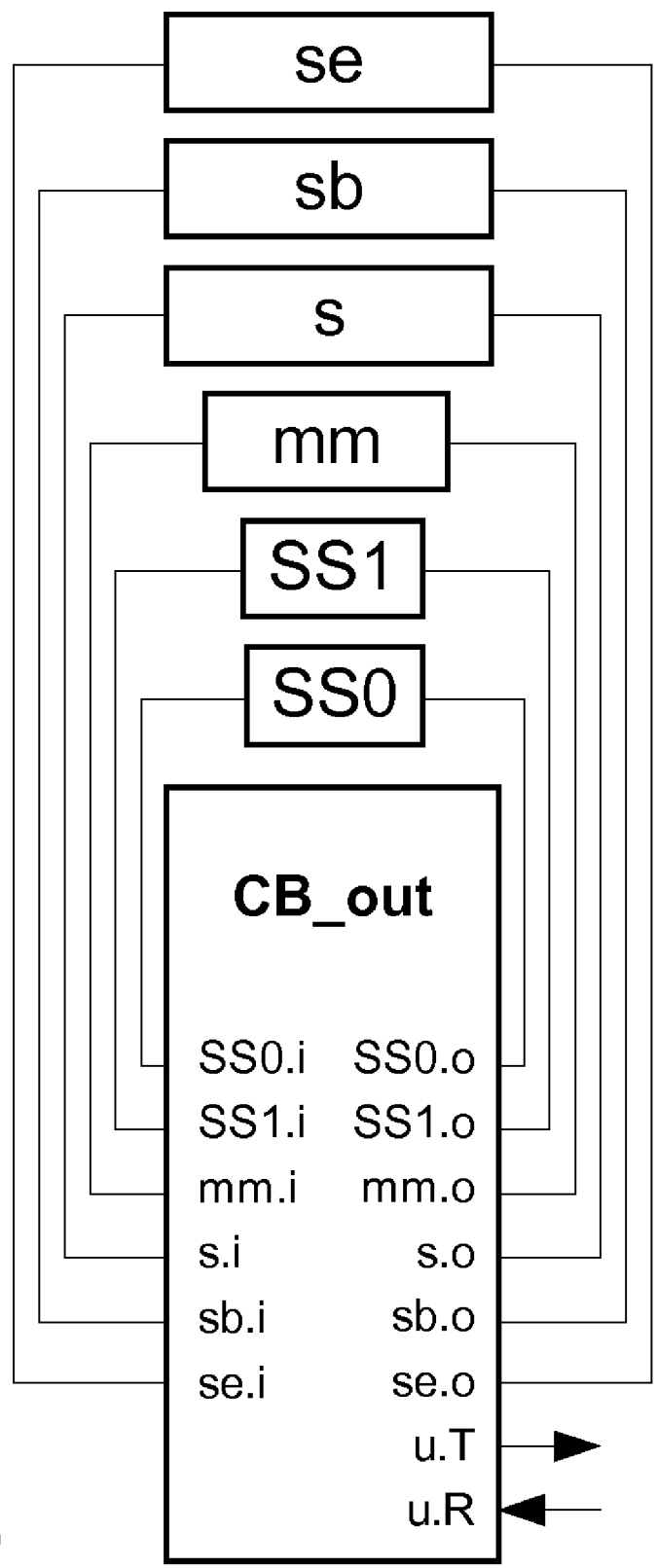
FIG. 16 shows the state machine that handles the output handshake, the primary storage begin marker loop sb, and output marker loop mm.

The state transition diagram for the circulating FIFO buffer staging and storage state machine is shown in FIG. 13. State A is the start state. State A transitions to State B and establishes a begin (head) marker in the storage begin marker loop and an end (tail) marker in the storage end marker loop. State B waits for a downstream request-to-send (RTS), maintains the contents of the storage loop, and maintains the contents of the storage end marker loop. Upon receiving a RTS, State A transitions to State C and sends a downstream clear-to-send (CTS), maintains the contents of the storage loop, and maintains the contents of the storage end marker loop. State C waits for a downstream begin-of-data bit, maintains the contents of the storage loop, and maintains the contents of the storage end marker loop. Upon receiving a downstream begin-of-data bit, State C transitions to State D sets the staging timing marker, maintains the contents of the storage loop, and maintains the contents of the storage end marker loop. State D loads the staging storage loop, waits for the staging timing loop marker to indicate the end of the input, maintains the contents of the storage loop, and maintains the contents of the storage end marker loop. Upon detecting the staging timing loop marker, State D transitions to State E, maintains the contents of the storage loop, and maintains the contents of the storage end marker loop. State E waits for the storage loop end marker, maintains the contents of the staging loop, and maintains the contents of the storage loop. Upon detecting the storage loop end marker, State E transitions to State F, sets the staging loop timing marker to test if there is sufficient room in the storage loop to save the contents of the staging loop, maintains the contents of the staging loop, and maintains the contents of the storage loop. State F tests if the storage loop has sufficient room to store the contents of the staging loop by waiting for either the staging loop timing marker or storage begin marker to appear, maintaining the contents of the staging loop, and maintaining the contents of the storage loop. Upon detecting the storage begin loop marker indicating that the storage loop is full, State F transitions to State E, maintains the contents of the staging loop, and maintains the contents of the storage loop. Upon detecting the staging timing marker indicating that the storage loop is not full, State F transitions to State G, maintains the contents of the staging loop, and maintains the contents of the storage loop. State G waits for the storage end marker, maintains the contents of the staging loop, and maintains the contents of the storage loop contents. Upon detecting the storage end marker State G transitions to State H, inserts a begin-of-data bit into the storage loop, and sets the staging loop marker. State H waits for the staging loop marker and transfers the contents of the staging loop to the storage loop. Upon detecting the staging timing marker State H transitions to State B, sets the storage end marker, and maintains the contents of the storage loop.

The state assignment table for the Circulating FIFO Buffer input and storage state machine is shown in FIG. 14. States A-H are represented by 000, 001, 011, 010, 110, 111, 101, and 100. Variables S2, S1, and S0 are used to represent the most significant bit, the second most significant bit, and the least significant bit of the assign state. The state transition table for the Circulating FIFO buffer input and storage state machine is shown in FIG. 15.

In more detail:

if (state==A) {state=B; sb.o=1; se.o=1 };

if (s.i==1 && d.R==0 && state==B) {state=B; s.0=1};

if (se.i==1 && d.R==0 && state==B) {state=B; se.o=1};

if (s.i==0 && d.R==1 && state==B) {state=C; d.T=1};

if (s.i==1 && d.R==1 && state==B) {state=C; s.o=1; d.T=1};

if (se.i==0 && d.R==1 && state==B) {state=C; d.T=};

if (s.i==1 && d.R==1 && state==C) {state=C; s.o=1 };

if (se.i==1 && d.R==1 && state==C) {state=C; se.o=};

if (s.i==1 && d.R==1 && state==C) {state=D; m.o=1 };

if (s.i==1 && d.R==1 && state==C) {state=D; m.o=1; s.o=1};

if (se.i==0 && d.R==1 && state==C) {state=D; m.o=1 };

if (se.i==1&& d.R==1 && state==C) {state=D; m.o=1; se.o=};

if (m.i==0 && d.R==1 && state==D) {state=D; d.o=1};

if (m.i==0 && s.i==1 && state==D) {state=D; s.o=1};

if (m.i==0 && se.i==1 && state==D) {state=D; se.o};

if (m.i==1 && s.i==1 && state==D) {state=E; s.o=1};

if (m.i==1 && s.i==1 && state==D) {state=E; s.o=1; se.o=1};

if (se.i==0 && b.i==1 && state==E) {state=E; b.o=1};

if (se.i==0 && state==E) {state=E; s.o=1};

if (se.i==1 && sb.i==0 && state==E) {state=F; m.o=1};

if (se.i==1 && b.i==1 && state==E) {state=F; m.o=1; b.o=1};

if (s.i==0 && se.i==1 && state==E) {state=F; m.o=1};

if (s.i==1 && se.i==1 && state==E) {state=F; m.o=1; s.o=1};

if (sb.i==1 && b.i==1 && state==F) {state=E; b.o=1};

if (s.i==1 && sb.i==1 && state==F) {state=E; s.o=1};

if (m.i==0 && sb.i==0 && b.i==1 && state==F) {state=F; b.o=1};

if (m.i==0 && s.i==1 && sb.i==0 && state==F) {state=F; s.o=1};

if (m.i==1 && b.i==1 && state==F) {state=G; b.o=1};

if (m.i==1 && s.i==1 && state==F) {state=G; s.o=1};

if (se.i==0 && b.i==1 && state==G) {state=G; b.o=1};

if (s.i==1 && se.i==0 && state==G) {state=G; s.o=1};

if (se.i==1 && state==G && state==G) {state=H; m.o=1};

if (m.i==0 && b.i==1 && state==H) {state=H; s.o=1}; and if (m.i==1 && state==H) {state=B; se.o=1}.

The state transition table shown in FIG. 15 is used to generate the following state equations:

$$m.o = s.i'd.RS2'S1S0 + s.id.RS2'S1S0 + se.i'd.RS2'S1S0 + \\ se.id.RS2'S1S0' + se.ib.i'S2S1S0' + se.ib.iS2S1S0' + \\ s.i'se.iS2S1S0' + s.ise.iS2S1S0' + se.iS2S1'S0$$
$$= d.RS2'S1S0 + se.id.RS2'S1S0' + se.iS2S1S0' + se.iS2S1'S0$$

$$s.o = s.id.R'S2'S1'S0 + s.id.RS2'S1'S0 + s.id.R'S2'S1S0 + \\ s.id.RS2'S1S0 + m.i's.iS2'S1S0' + m.is.iS2'S1S0' + \\ se.i'S2S1S0' + s.ise.iS2S1S0' + s.isb.iS2S1S0 + \\ m.i's.isb.i'S2S1S0 + m.is.iS2S1S0 + s.ise.i'S2S1'S0 + \\ m.i'b.iS2S1'S0' + m.is.id.R'S2S1'S0'$$
$$= s.iS2'S0 + s.iS2'S1S0' + se.i'S2S1S0' + \\ s.ise.iS2S1S0' + s.isb.iS2S1S0 + m.i's.isb.i'S2S1S0 + \\ m.is.iS2S1S0 + s.ise.i'S2S1'S0 + m.i'b.iS2S1'S0'$$

$$sb.o = S2'S1'S0'$$

$$se.o = S2'S1'S0' + se.id.R'S2'S1'S0 + se.id.RS2'S1'S0 + \\ se.id.R'S2'S1S0 + se.id.RS2'S1S0 + m.i'se.iS2'S1S0' + \\ m.id.R'S2S1'S0' + m.is.i'd.R'S2S1'S0' + m.is.iS2'S1S0' + \\ m.id.R'S2S1'S0'$$
$$= S2'S1'S0' + se.iS2'S0 + m.i'se.iS2'S1S0' + m.is.iS2'S1S0'$$

$$b.o = m.i'd.RS2'S1S0' + se.i'b.iS2S1S0' + se.ib.iS2S1S0' + sb.ib.iS2S1S0 + \\ m.i'sb.i'b.iS2S1S0 + m.ib.iS2S1S0 + se.i'b.iS2S1'S0$$
$$= m.i'd.RS2'S1S0' + b.iS2S1S0' + sb.ib.iS2S1S0 + m.i'sb.i'b.iS2S1S0 + \\ m.ib.iS2S1S0 + se.i'b.iS2S1'S0$$

$$d.T = s.i'd.RS2'S1'S0 + s.id.RS2'S1'S0 + se.i'd.RSS2'S1'S0$$
$$= d.RSS2'S1'S0$$

$$S2 = m.is.iS2'S1S0' + se.i'b.iS2S1S0' + se.i'S2S1S0' + se.ib.i'S2S1S0' + \\ se.ib.iS2S1S0' + s.i'se.iS2S1S0' + s.ise.iS2S1S0' + sb.ib.iS2S1S0 + \\ s.isb.iS2S1S0 + m.i'sb.i'b.iS2S1S0 + m.i's.isb.i'S2S1S0 + \\ m.ib.iS2S1S0 + m.is.iS2S1S0 + se.i'b.iS2S1'S0 + s.ise.i'S2S1'S0 + \\ se.iS2S1'S0 + m.i'b.iS2S1'S0'$$
$$= m.is.iS2'S1S0' + S2S1S0' + sb.ib.iS2S1S0 + s.isb.iS2S1S0 + \\ m.i'sb.i'b.iS2S1S0 + m.i's.isb.i'S2S1S0 + m.ib.iS2S1S0 + \\ m.is.iS2S1S0 + se.i'b.iS2S1'S0 + s.ise.i'S2S1'S0 + \\ se.iS2S1'S0 + m.i'b.iS2S1'S0'$$

$$S1 = s.i'd.RS2'S1'S0 + s.id.RS2'S1'S0 + se.i'd.RS2'S1'S0 + \\ se.id.RS2'S1'S0 + s.id.R'S2'S1S0 + se.id.R'S2'S1S0 + \\ s.i'd.RS2'S1S0 + s.id.RS2'S1S0 + se.i'd.RS2'S1S0 + \\ se.id.RS2'S1S0 + m.i'd.RS2'S1S0' + m.i's.iS2'S1S0' + \\ m.i'se.iS2'S1S0' + m.is.iS2'S1S0' + se.i'b.iS2S1S0' + \\ se.i'S2S1S0' + se.ib.i'S2S1S0' + se.ib.iS2S1S0' + s.i'se.iS2S1S0' + \\ s.ise.iS2S1S0' + sb.ib.iS2S1S0 + s.isb.iS2S1S0 + \\ m.i'sb.i'b.iS2S1S0 + m.i's.isb.i'S2S1S0$$
$$= d.RS2'S0 + s.id.R'S2'S1S0 + se.id.R'S2'S1S0 + m.i'd.RS2'S1S0' + \\ m.i'se.iS2'S1S0' + s.iS2'S1S0' + S2S1S0' + sb.ib.iS2S1S0 + \\ s.isb.iS2S1S0 + m.i'sb.i'b.iS2S1S0 + m.i's.isb.i'S2S1S0$$

$$S0 = S2'S1'S0' + s.id.R'S2'S1'S0 + se.id.R'S2'S1'S0 + s.i'd.RS2'S1'S0 + \\ s.id.RS2'S1'S0 + se.i'd.RS2'S1'S0 + se.id.RS2'S1'S0 + \\ s.id.R'S2'S1S0 + se.id.R'S2'S1S0 + se.ib.i'S2S1S0' + \\ se.ib.iS2S1S0' + s.i'se.iS2S1S0' + s.ise.iS2S1S0' + \\ m.i'sb.i'b.iS2S1S0 + m.i's.isb.i'S2S1S0 + m.ib.iS2S1S0 + \\ m.is.iS2S1S0 + se.i'b.iS2S1'S0 + s.ise.i'S2S1'S0 + m.id.R'S2S1'S0' + \\ m.is.i'd.R'S2S1'S0' + m.is.id.R'S2S1'S0'$$
$$= S2'S1'S0' + d.RS2'S1'S0 + s.id.R'S2'S1S0 + se.id.R'S2'S0 + \\ se.iS2S1S0' + m.i'sb.i'b.iS2S1S0 + m.i's.isb.i'S2S1S0 + \\ m.ib.iS2S1S0 + m.is.iS2S1S0 + se.i'b.iS2S1'S0 + s.ise.i'S2S1'S0$$

Figures 17, 18:
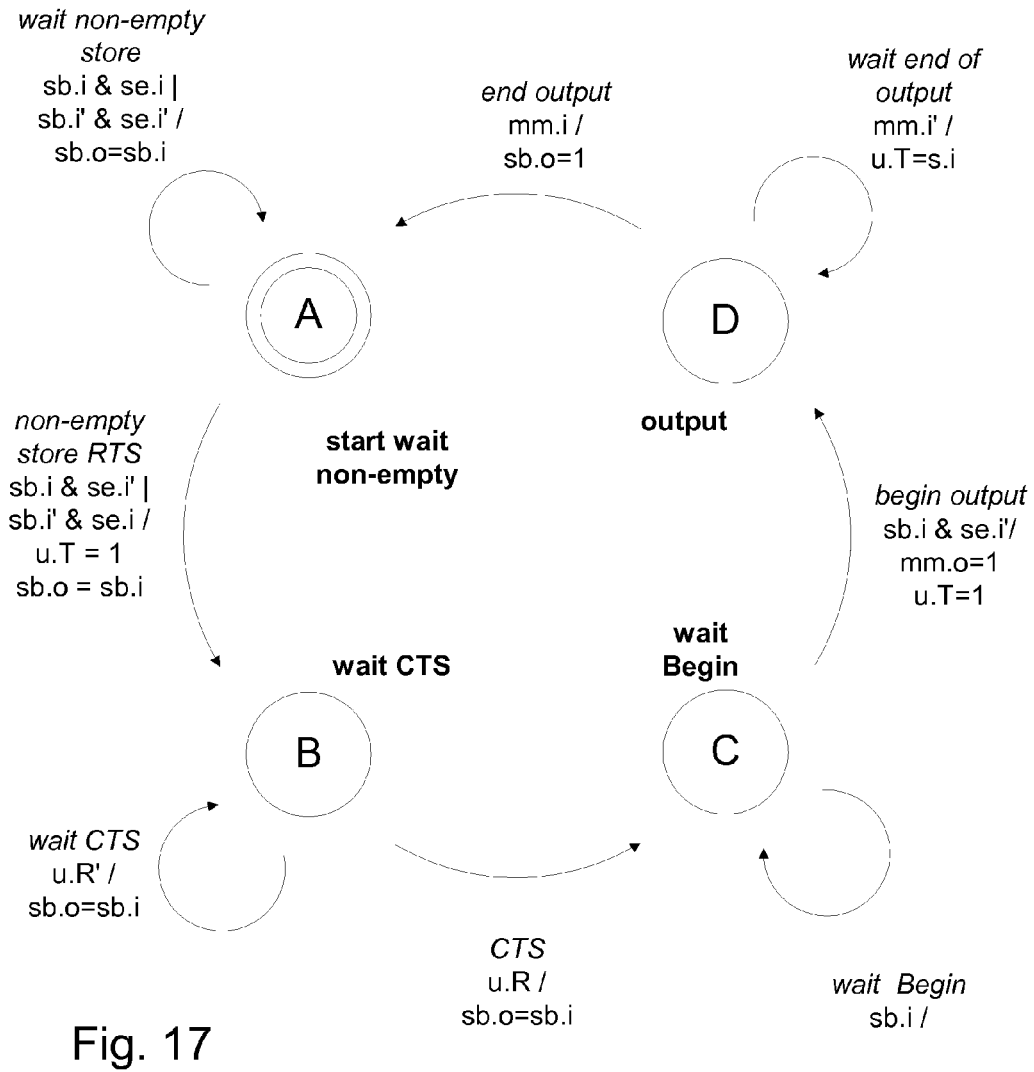
FIG. 17 shows the state transition diagram for the state machine shown in FIG. 16.
FIG. 18 shows the state assignments for the state transition diagram shown in FIG. 17.

The Circulating FIFO Buffer output state machine that handles the output handshake, the primary storage begin marker loop sb, and output marker loop mm is shown in FIG. 17. The storage elements of the state machine are comprised of state bit SS0, state bit SS1, output marker storage mm, primary storage loop s, storage begin marker loop sb, and storage loop end marker loop se. The inputs to the combinatoric logic section of the state machine are comprised of state bit SS0 input, SS0.i; state bit SS1 input, SS1.i; output marker storage, mm.i; primary storage loop input, s.i; storage begin marker loop input, sb.i; storage end marker loop input, se.i; and upstream receive input, u.R. The outputs of the combinatoric logic section are comprised of state bit SS0 output, SS0.o; state bit SS1 output, SS1.o; output marker, mm.o; primary storage loop output, s.o; storage begin marker output, sb.o; storage end marker output, se.o; and upstream transmit output, u.T.

The state transition diagram for the circulating FIFO buffer output state machine is shown in FIG. 17. State A is the start state. State A waits if the storage loop is empty and maintains the contents of the storage begin loop. Upon detecting that the storage loop is non-empty, State A transitions to State B; transmits a request-to-send (RTS) and maintains the contents of the storage begin loop. State B waits for a clear-to-send (CTS) and maintains the contents of the storage begin loop. Upon receiving a clear-to-send, State B transitions to State C and maintains the contents of the storage begin marker loop. State C waits for the storage begin marker and maintains the contents of the storage begin marker loop. Upon detecting the storage begin marker, State C transitions to State D; sets the staging timing marker and sending an upstream begin-of-data bit. State D waits for the end of the data transfer by monitoring the staging timing marker loop and transferring the contents of the storage loop to the upstream transmit output. Upon detecting the staging timing marker, State D transitions to State A and sets the storage begin marker.

The state assignment table for the Circulating FIFO buffer output state machine is shown in FIG. 18. States A through D are represented by 00, 01, 11, and 10. Variables SS1 and SS0 are used to represent the most significant bit and the least significant bit of the assigned state.

The state transition diagram for the Circulating FIFO buffer output state machine shown in FIG. 17 and the state assignment table shown in FIG. 18 are used to generate the state transition table shown in FIG. 19.

In more detail: if (sb.i==1 && se.i==1 && state1==A) {state1=A; sb.o=1}; if (sb.i==1 && se.i==0 && state1==A) {state1=B; sb.o=1; u.T=1}; if (sb.i==0 && se.i==1 && state1==A) {state1=B; u.T=1 }; if (sb.i==1 && u.R==0 && state1==B) {state1=B; sb.o=1 }; if (sb.i==1 && u.R==1 && state1==B) {state1=C; sb.o=1}; if (sb.i==1 && state1==C) {sb.o=1 }; if (sb.i==1 && se.i==0 && state1==C) {state1=D; m.o=1; u.T=1}; if (m.i==0 && s.i==1 && state1==D) {state1=D; u.T=1}; and if (m.i==1 && state1==D) {state1=1; sb.o=1}.

These state transitions generate the following state equations:

$$mm.o = sb.ise.i'SS1SS0$$

$$sb.o = sb.ise.iSS1'SS0' + sb.ise.i'SS1'SS0' + sb.iu.R'SS1'SS0 + sb.iu.RSS1'SS0 + mm.iSS1SS0'$$
$$= sb.iSS1' + mm.iSS1SS0'$$

$$u.T = sb.ise.i'SS1'SS0' + sb.i'se.iSS1'SS0' + sb.ise.i'SS1SS0 + mm.i's.iSS1SS0'$$
$$= sb.ise.i'SS1'SS0' + sb.i'se.iSS1'SS0' + sb.ise.i'SS1SS0 + mm.i's.iSs1SS0'$$

$$SS1 = sb.iu.RSS1'SS0 + sb.i.SS1SS0 + sb.ise.i'SS1SS0 + mm.i's.iSS1SS0'$$
$$= sb.iu.RSS1'SS0 + sb.iSS1SS0 + mm.i's.iSs1SS0'$$

$$SS0 = sb.ise.i'SS1SS0' + sb.i'se.iSS1'SS0' + sb.iu.R'SS1'SS0 + sb.iu.RSS1'SS0 + sb.iSS1SS0$$
$$= sb.ise.i'SS1'SS0' + sb.i'se.iSS1'SS0' + sb.iSS0$$

Figure 20:
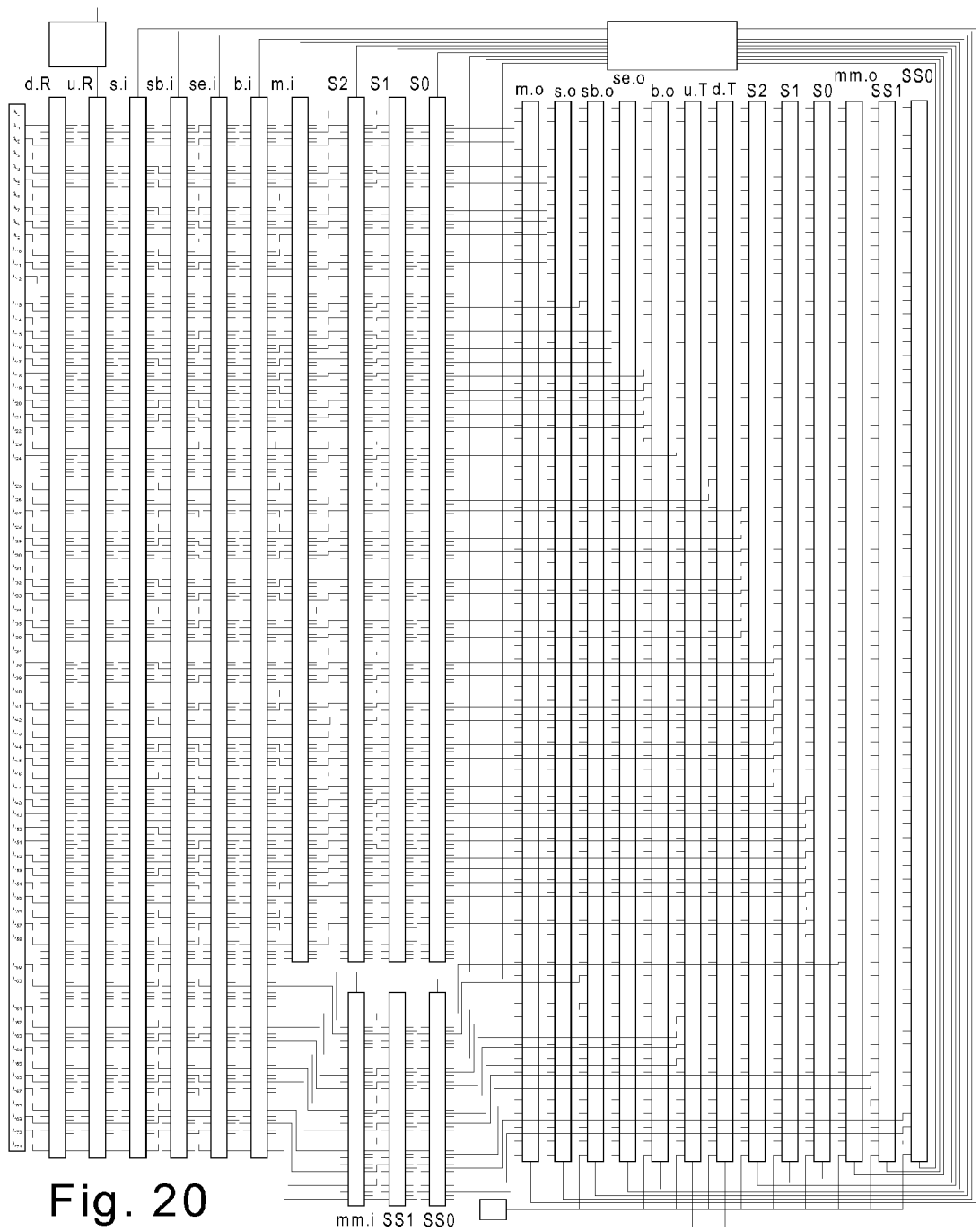
FIG. 20 shows an overview of the optical implementation for the Circulating FIFO Buffer state machines shown in FIG. 15 and FIG. 19.
Figure 20A:
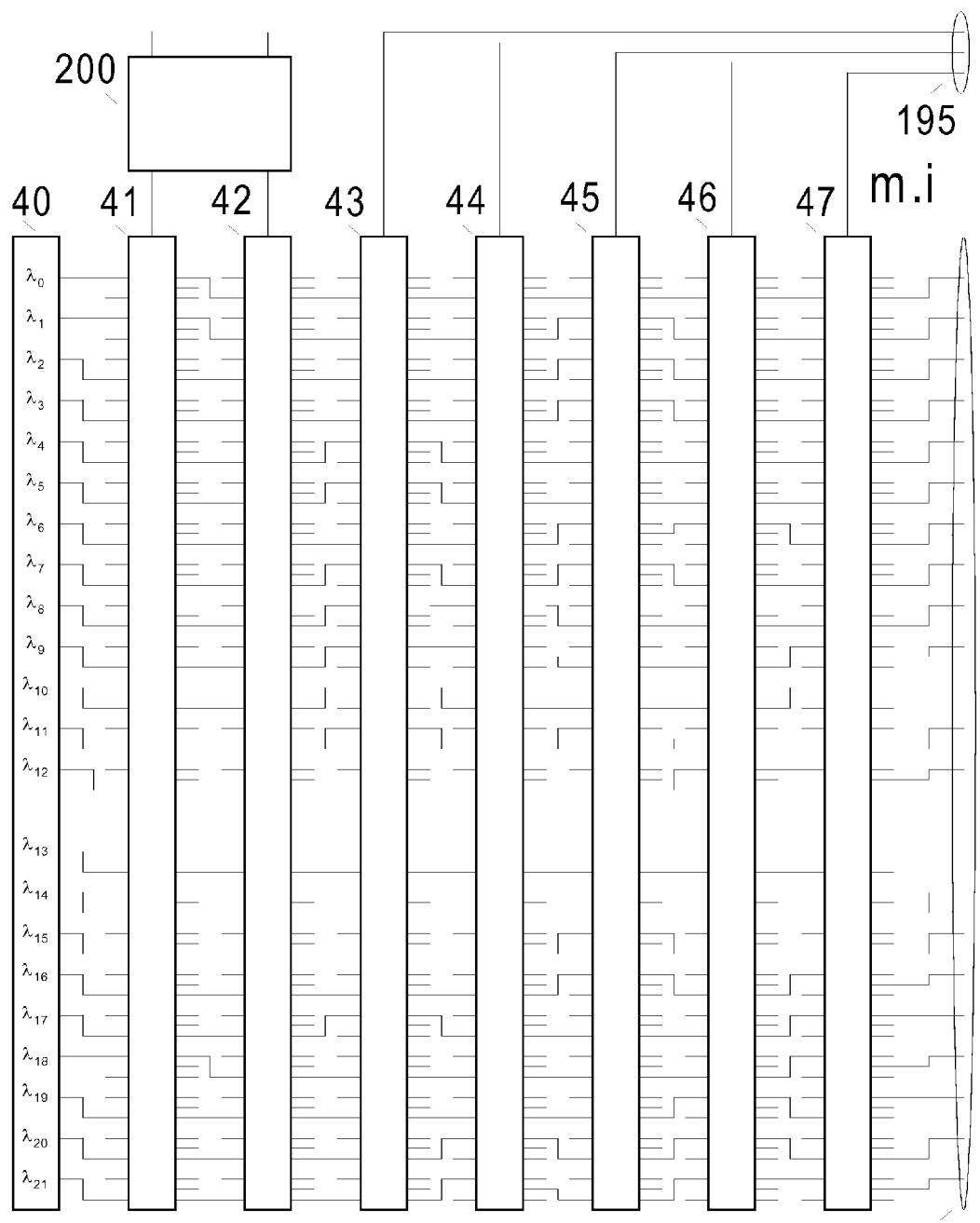
FIG. 20A shows the top left portion of the Circulating FIFO Buffer optical state machine shown in FIG. 20.
Figure 20B:
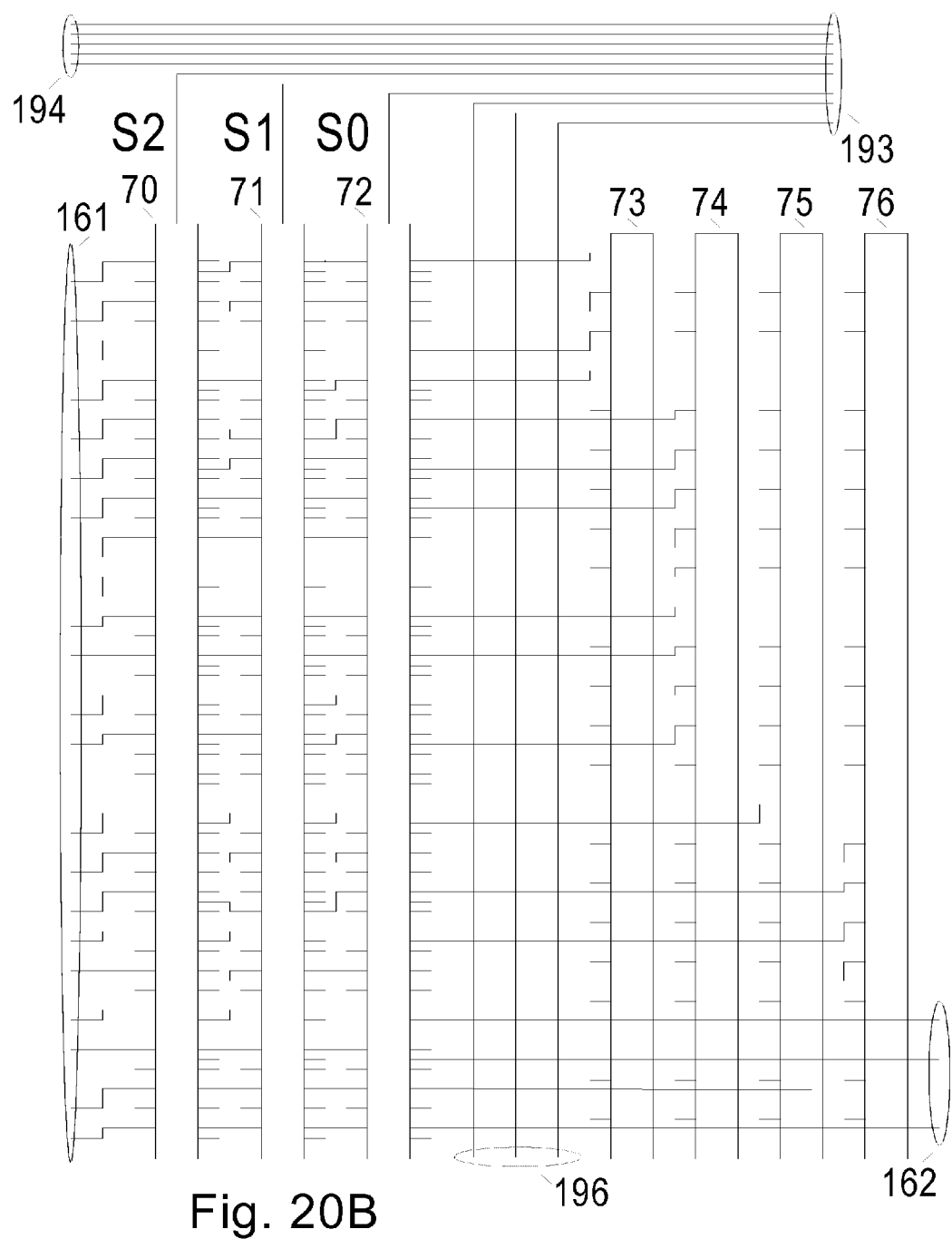
FIG. 20B shows the top middle portion of the Circulating FIFO Buffer optical state machine shown in FIG. 20.
Figure 20C:
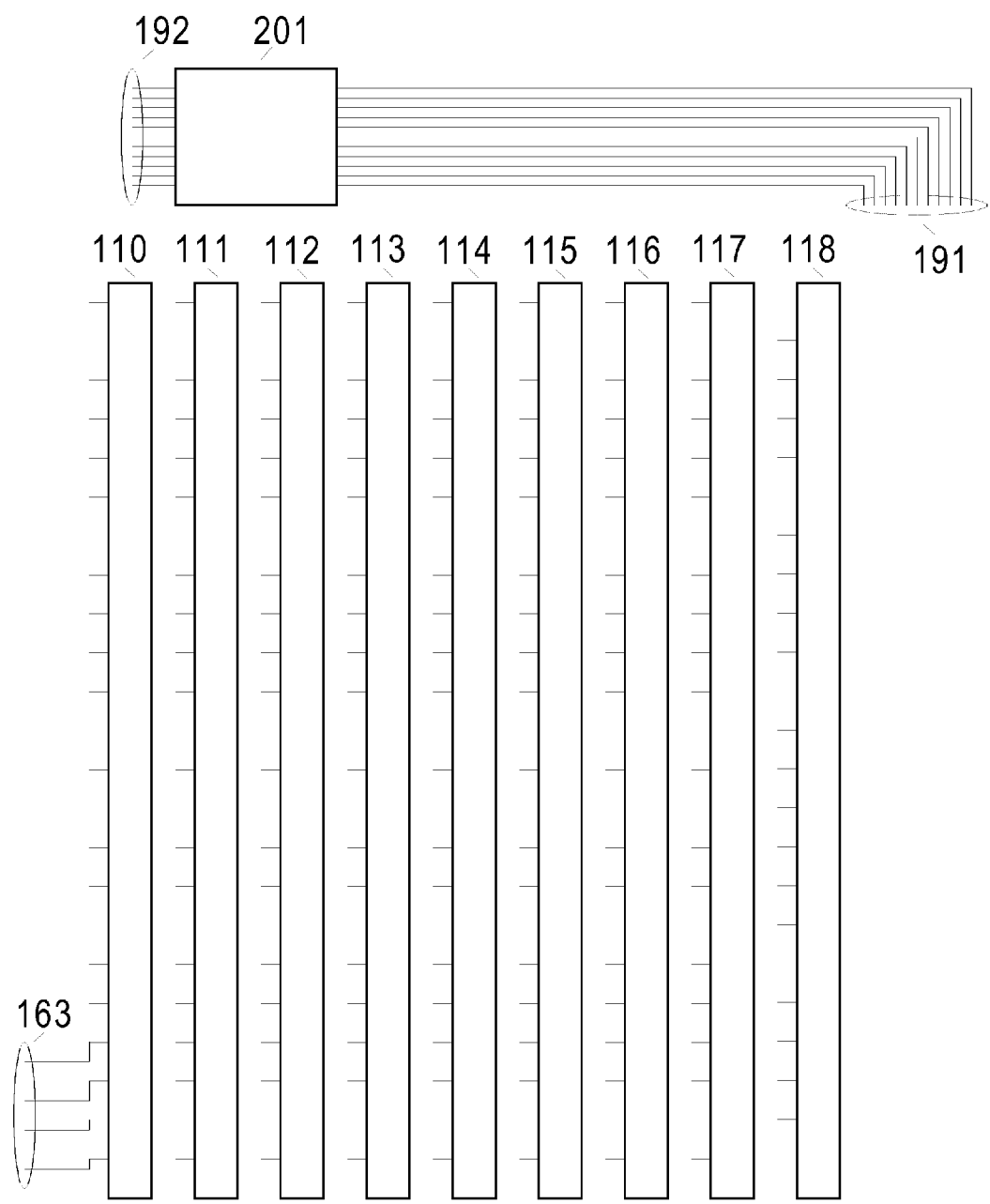
FIG. 20C shows the top right portion of the Circulating FIFO Buffer optical state machine shown in FIG. 20.
Figure 20D:
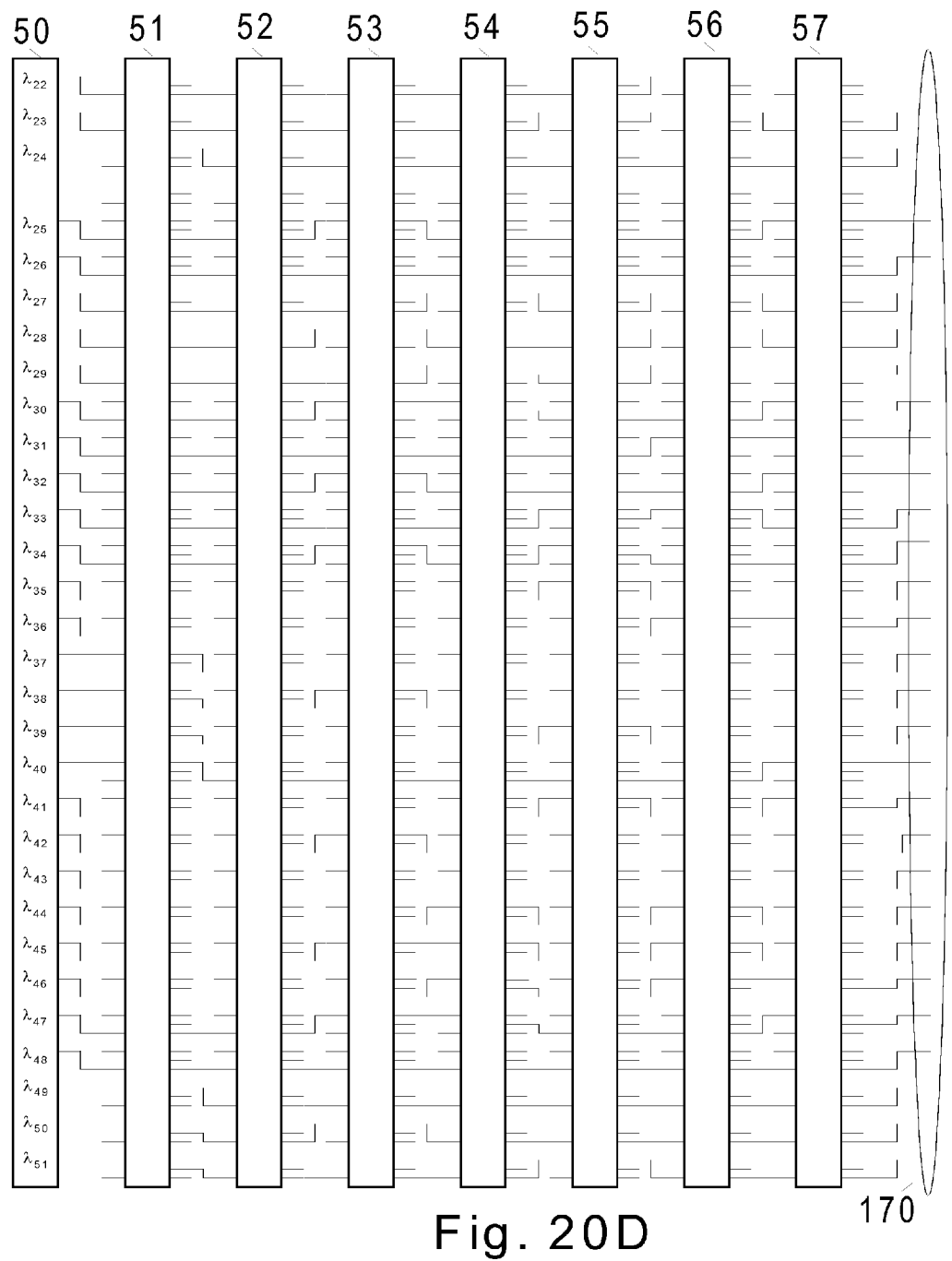
FIG. 20D shows the middle left portion of the Circulating FIFO Buffer optical state machine shown in FIG. 20.
Figure 20E:
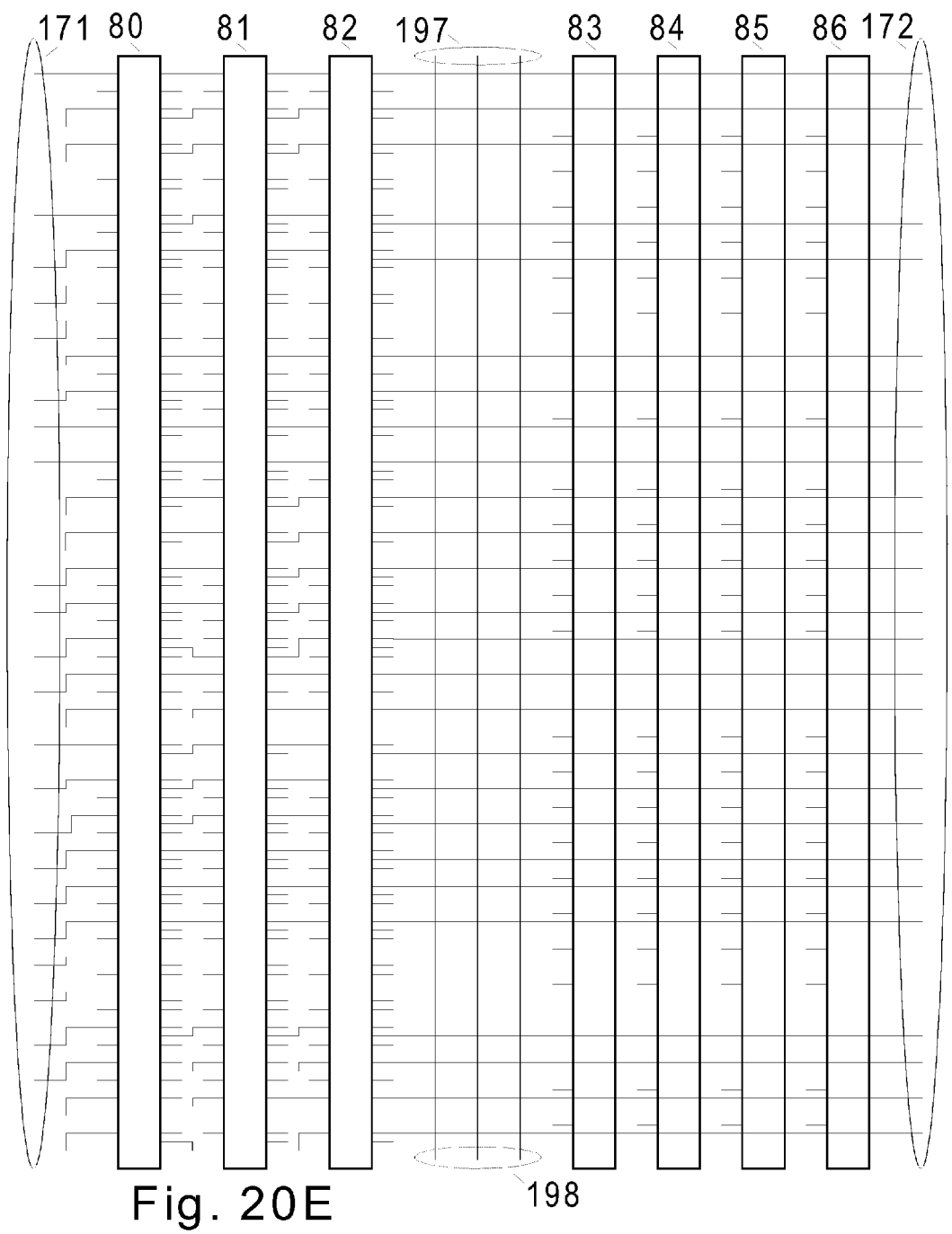
FIG. 20E shows the middle middle portion of the Circulating FIFO Buffer optical state machine shown in FIG. 20.
Figure 20F:
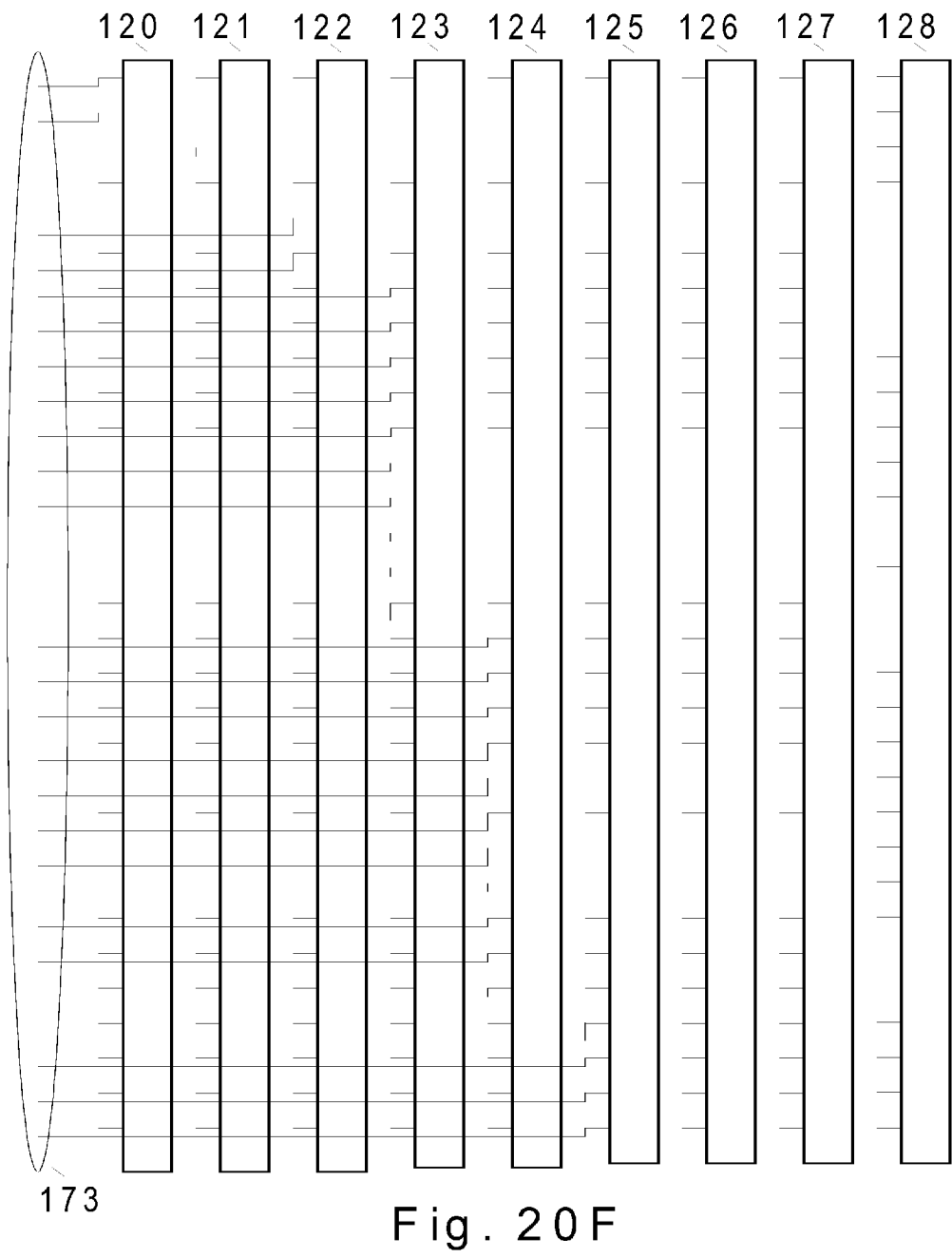
FIG. 20F shows the middle right portion of the Circulating FIFO Buffer optical state machine shown in FIG. 20.
Figure 20G:
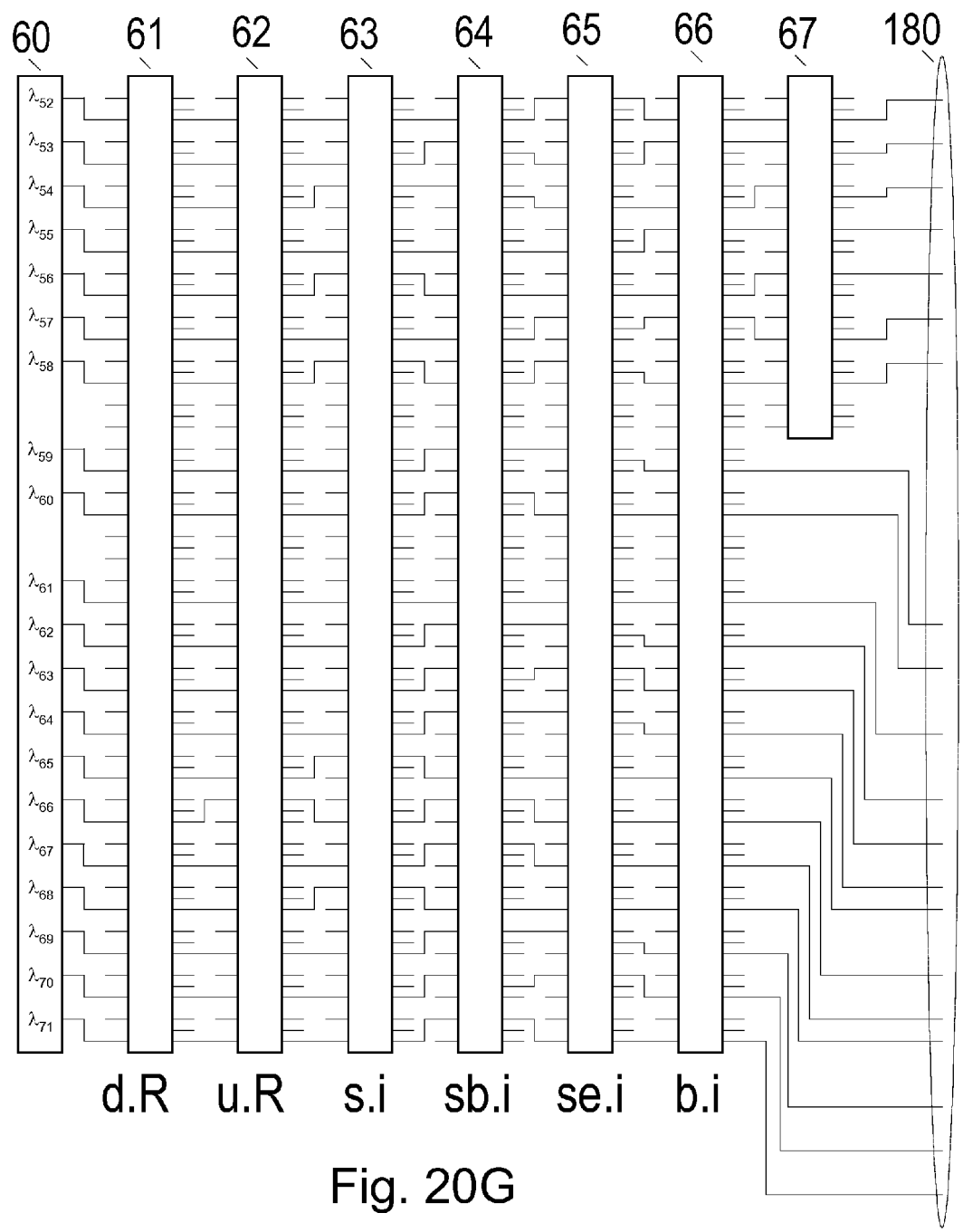
FIG. 20G shows the bottom left portion of the Circulating FIFO Buffer optical state machine shown in FIG. 20.
Figure 20H:
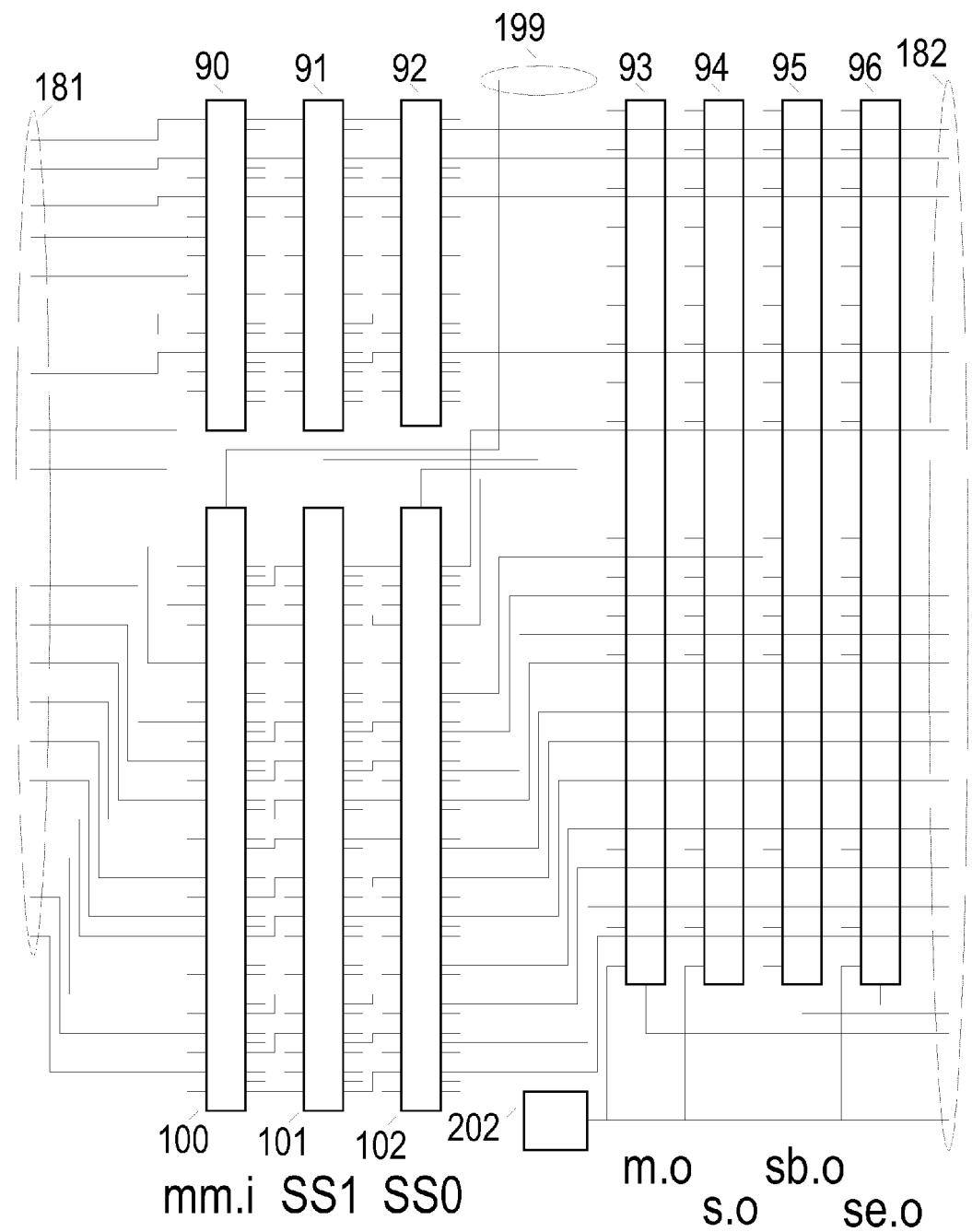
FIG. 20H shows the bottom middle portion of the Circulating FIFO Buffer optical state machine shown in FIG. 20.
Figure 20I:
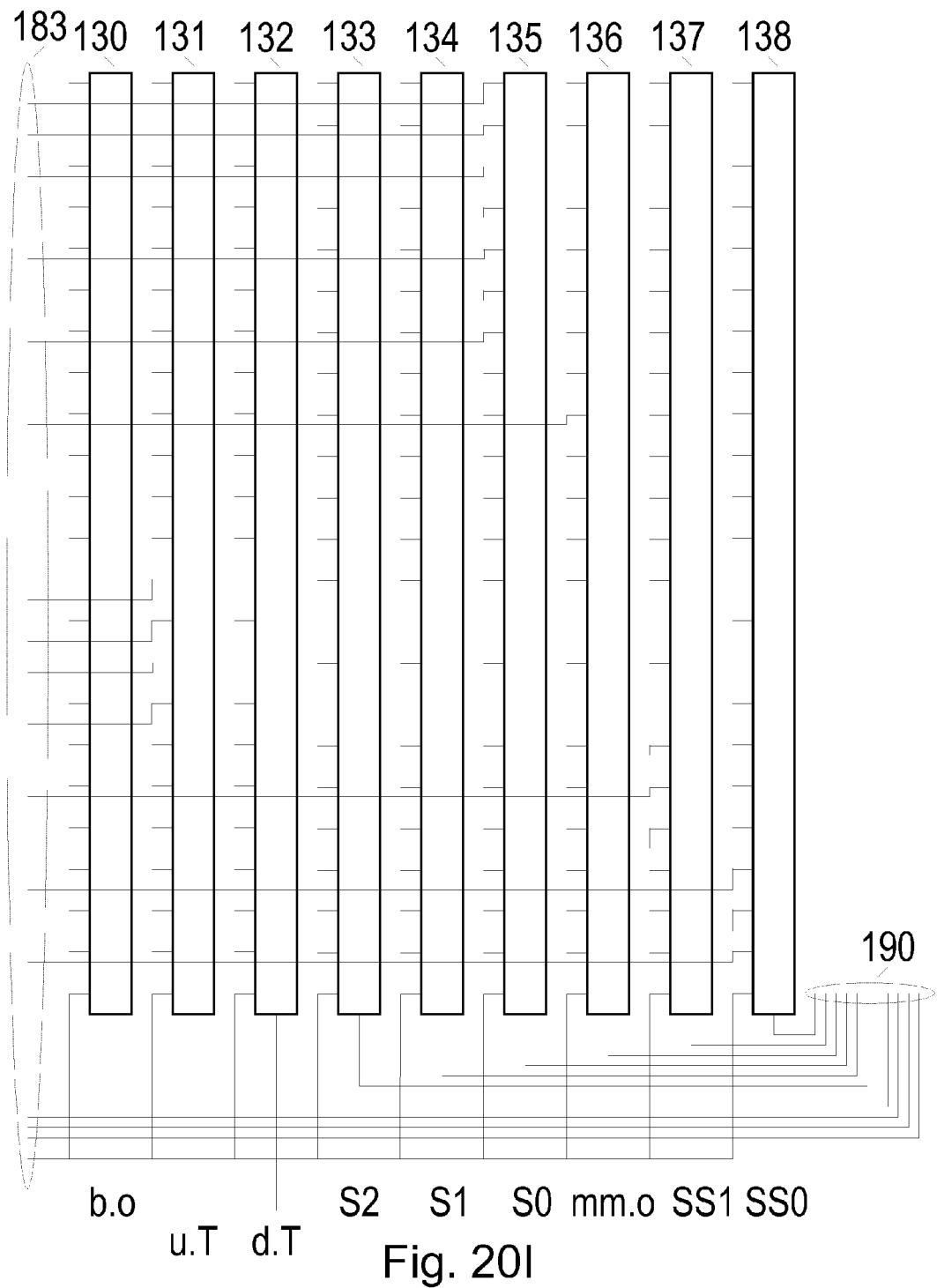
FIG. 20I shows the bottom right portion of the Circulating FIFO Buffer optical state machine shown in FIG. 20.

The optical state machine for the Circulating FIFO Buffer is shown in overview in FIG. 20 and in more detail in FIG. 20A, FIG. 20B, FIG. 20C, FIG. 20D, FIG. 20E, FIG. 20F, FIG. 20G, FIG. 20H, and FIG. 20I. The top, middle, and bottom portions of a Source module shown as 40 in FIG. 20A. 50 in FIG. 20D, 60 in FIG. 20G are collectively referred to as 40X. The top, middle, and bottom portions of an AND/BYPASS module shown as 41 in FIG. 20A. 51 in FIG. 20D, 61 in FIG. 20G are collectively referred to as 41X. The top, middle, and bottom portions of an AND/BYPASS module shown as 42 in FIG. 20A. 52 in FIG. 20D, 62 in FIG. 20G are collectively referred to as 42X. The top, middle, and bottom portions of an AND/BYPASS module shown as 43 in FIG. 20A. 53 in FIG. 20D, 63 in FIG. 20G are collectively referred to as 43X. The top, middle, and bottom portions of an AND/BYPASS module shown as 44 in FIG. 20A. 54 in FIG. 20D, 64 in FIG. 20G are collectively referred to as 44X. The top, middle, and bottom portions of an AND/BYPASS module shown as 45 in FIG. 20A. 55 in FIG. 20D, 65 in FIG. 20G are collectively referred to as 45X. The top, middle, and bottom portions of an AND/BYPASS module shown as 46 in FIG. 20A. 56 in FIG. 20D, 66 in FIG. 20G are collectively referred to as 46X. The top, middle, and bottom portions of an AND/BYPASS module shown as 47 in FIG. 20A. 57 in FIG. 20D, 67 in FIG. 20G are collectively referred to as 47X. The top, middle, and bottom portions of an AND/BYPASS module shown as 70 in FIG. 20B. 80 in FIG. 20E, 90 in FIG. 20H are collectively referred to as 70X. The top, middle, and bottom portions of an AND/BYPASS module shown as 71 in FIG. 20B. 81 in FIG. 20E, 91 in FIG. 20H are collectively referred to as 71X. The top, middle, and bottom portions of an AND/BYPASS module shown as 72 in FIG. 20B. 82 in FIG. 20E, 92 in FIG. 20H are collectively referred to as 72X. AND/BYPASS module 100 in FIG. 20H is also referred to as 100X. AND/BYPASS module 101 in FIG. 20H is also referred to as 101X. AND/BYPASS module 102 in FIG. 20H is also referred to as 102X. The top, middle, and bottom portions of an OR module shown as 73 in FIG. 20B, 83 in FIG. 20E, and 93 in FIG. 20H are collectively referred to as 73X. The top, middle, and bottom portions of an OR module shown as 74 in FIG. 20B, 84 in FIG. 20E, and 94 in FIG. 20H are collectively referred to as 74X. The top, middle, and bottom portions of an OR module shown as 75 in FIG. 20B, 85 in FIG. 20E, and 95 in FIG. 20H are collectively referred to as 75X. The top, middle, and bottom portions of an OR module shown as 76 in FIG. 20B, 86 in FIG. 20E, and 96 in FIG. 20H are collectively referred to as 76X. The top, middle, and bottom portions of an OR module shown as 110 in FIG. 20C, 120 in FIG. 20F, and 130 in FIG. 20I are collectively referred to as 110X. The top, middle, and bottom portions of an OR module shown as 111 in FIG. 20C, 121 in FIG. 20F, and 131 in FIG. 20I are collectively referred to as 111X. The top, middle, and bottom portions of an OR module shown as 112 in FIG. 20C, 122 in FIG. 20F, and 132 in FIG. 20I are collectively referred to as 112X. The top, middle, and bottom portions of an OR module shown as 113 in FIG. 20C, 123 in FIG. 20F, and 133 in FIG. 20I are collectively referred to as 113X. The top, middle, and bottom portions of an OR module shown as 114 in FIG. 20C, 124 in FIG. 20F, and 134 in FIG. 20I are collectively referred to as 114X. The top, middle, and bottom portions of an OR module shown as 115 in FIG. 20C, 125 in FIG. 20F, and 135 in FIG. 20I are collectively referred to as 115X. The top, middle, and bottom portions of an OR module shown as 116 in FIG. 20C, 126 in FIG. 20F, and 136 in FIG. 20I are collectively referred to as 116X. The top, middle, and bottom portions of an OR module shown as 117 in FIG. 20C, 127 in FIG. 20F, and 137 in FIG. 20I are collectively referred to as 117X. The top, middle, and bottom portions of an OR module shown as 118 in FIG. 20C, 128 in FIG. 20F, and 138 in FIG. 20I are collectively referred to as 118X.

A Pipeline Delay module 200 is shown in FIG. 20A. A Supplemental Feedback Delay module 201 is shown in FIG. 20C. An Optical Clock module 202 is shown in FIG. 20H.

Physically, connections 160 in FIG. 20A are connected to connections 161 FIG. 20B. Connections 162 in FIG. 20B are connected to connections 163 in FIG. 20C. Connections 170 in FIG. 20D are connected to connections 171 in FIG. 20E. Connections 172 in FIG. 20E are connected to connections 173 in FIG. 20F. Connections 180 in FIG. 20G are connected to connections 181 in FIG. 20H. Connections 182 in FIG. 20H are connected to connections 183 in FIG. 20I. Connections 190 in FIG. 20I are connected to connections 191 in FIG. 20C. Connections 192 in FIG. 20C are connected to connections 193 in FIG. 20B. Connections 194 in FIG. 20B are connected to connections 195 in FIG. 20A. Connections 196 in FIG. 20B are connected to connections 197 in FIG. 20E. Connections 198 in FIG. 20E are connected to connections 199 in FIG. 20H.

Logically, the outputs of Source module 40X are connected to the inputs of AND/BYPASS module 41X. The outputs of AND/BYPASS module 41X are connected to the inputs of AND/BYPASS module 42X. The outputs of AND/BYPASS module 42X are connected to the inputs of AND/BYPASS module 43X. The outputs of AND/BYPASS module 43X are connected to the inputs of AND/BYPASS module 44X. The outputs of AND/BYPASS module 44X are connected to the inputs of AND/BYPASS module 45X. The outputs of AND/BYPASS module 45X are connected to the inputs of AND/BYPASS module 46X. A portion of the outputs of AND/BYPASS module 46X is connected to the inputs of AND/BYPASS module 47X. The outputs of AND/BYPASS module 47X are connected to the inputs of AND/BYPASS module 70X. The outputs of AND/BYPASS module 70X are connected to the inputs of AND/BYPASS module 71X. The outputs of AND/BYPASS module 71X are connected to the inputs of AND/BYPASS module 72X. The outputs of AND/BYPASS module 72X are connected to either the inputs of OR modules 73X, 74X, 75X, 76X, 110X, 111X, 112X, 113X, 114X, 115X, and 116X. A portion of the outputs of AND/BYPASS module 46X is connected to the inputs of AND/BYPASS module 100X. The outputs of AND/BYPASS module 100X are connected to the inputs of AND/BYPASS module 101X. The outputs of AND/BYPASS module 101X are connected to the inputs of AND/BYPASS module 102X. The outputs of AND/BYPASS module 102X are connected to the inputs of either OR modules 75X, 111X, 116X, 117X or 118X. The outputs of OR modules 73X, 74X, 75X, 76X, 110X, 111X, 112X, 113X, 114X, 115X, 116X, 117X, and 118X represent variables m.o, s.o, sb.o, se.o, b.o, u.T, d.T, S2, S1, S0, mm.o, SS1, and SS0. The outputs of OR modules 73X, 74X, 75X, 76X, 110X, 113X, 114X, 115X, 116X, 117X, and 118X are connected to the inputs of Supplemental Feedback module 201. The outputs of Supplemental Feedback module corresponding to these inputs are connected to the control inputs of AND/BYPASS modules 43X, 44X, 45X, 46X, 47X, 70X, 71X, 72X, 100X, 101X, and 102X. The output of Clock module 202 is connected to the clock inputs of OR modules 73X, 74X, 75X, 76X, 110X, 111X, 112X, 113X, 114X, 115X, 116X, 117X, and 118X. Inputs d.R and u.R are connected to the inputs of Pipeline Delay module 200 shown in FIG. 20A. The outputs of Pipeline Delay module 200 are connected to the control inputs of AND/BYPASS modules 41X and 42X. The outputs of OR modules 111X and 112X are connected to upstream output u. T and downstream output d. T.

The length of the optical delays associated with state bits S0, S1, S0, SS1, and SS0 are equal to one bit before any temporal interlacing or latency compensation. The length of the optical delay associated with the staging loop b, staging loop marker loop m, and output marker loop mm are equal to X bits before any temporal interlacing or latency compensation. The length of the optical delay associated with the main storage loop, s; main storage loop begin marker loop, sb; and main storage loop end marker loop, se, are equal and equal to n*(X+1) bits where n is a positive integer before any temporal interlacing or latency compensation.

Given that the staging, staging marker, and output marker loops are X bit periods long; that the primary storage, storage begin marker, and storage end marker loops are n*(X+1) bit periods long where n is a positive integer; that the interlace factor is n_interlace and that the delay of an AND/BYPASS module is D_AND/BYPASS bit periods; and that the delay of an OR module is D_OR bit periods then the Supplemental Feedback delay for m is n_interlace*X−(4*D_AND/BYPASS+D_OR); s is n_interlace*n*(X+1)−(8* D_AND/BYPASS+D_OR); sb is n_interlace*n*(X+1)−(7*D_AND/BYPASS+D_OR); se is n_interlace*n*(X+1)−(6*D_AND/BYPASS+D_OR); b is n_interlace*X−(5*D_AND/BYPASS+D_OR); S2 is n_interlace−(3*D_AND/BYPASS+D_OR); S1 is n_interlace−(2*D_AND/BYPASS+D_OR); S0 is n_interlace−(D_AND/BYPASS+D_OR); mm is n_interlace*X−(3*D_AND/BYPASS+D_OR); SS1 is n_interlace−(2*D_AND/BYPASS+D_OR); and SS0 is n_interlace−(D_AND/BYPASS+D_OR) bit periods. The Pipeline Module delay for d_R is zero and for u.R is D_AND/BYPASS bit periods.

In more detail, midterms d.RS2'S1S0, se.id.RS2'S1S0', se.iS2S1S0', se.iS2S1'S0, s.iS2'S0, s.iS2'S1S0', se.i'S2S1S0', s.ise.iS2S1S0', s.isb.iS2S1S0, m.i's.isb.i'S2S1S0, m.is.iS2S1S0, s.ise.i'S2S1'S0, m.i'b.iS2S1'S0', S2'S1'S0', S2'S1'S0', se.iS2'S0, m.i'se.iS2'S1S0', m.id.R'S2S1'S0', m.i'd.RS2'S1S0', b.iS2S1S0', sb.ib.iS2S1S0, m.i'sb.i'b.iS2S1S0, m.ib.iS2S1S0, se.i'b.iS2S1'S0, d.RS2'S1'S0, m.is.iS2'S1S0', S2S1S0', sb.ib.iS2S1S0, s.isb.iS2S1S0, m.i'sb.i'b.iS2S1S0, m.i's.isb.i'S2S1S0, m.ib.iS2S1S0, m.is.iS2S1S0, se.i'b.iS2S1'S0, s.ise.i'S2S1'S0, se.iS2S1'S0, m.i'b.iS2S1'S0', d.RS2'S0, s.id.R'S2'S1S0, se.id.R'S2'S1S0, m.i'd.RS2'S1S0', m.i'se.iS2'S1S0', s.iS2'S1S0', S2S1S0', sb.ib.iS2S1S0, s.isb.iS2S1S0, m.i'sb.i'b.iS2S1S0, m.i's.isb.i'S2S1S0, S2'S1'S0', d.RS2'S1'S0, s.id.R'S2'S1S0, se.id.R'S2'S1S0, se.iS2S1S0', m.i'sb.i'b.iS2S1S0, m.i's.isb.i'S2S1S0, m.ib.iS2S1S0, mis.iS2S1S0, se.i'b.iS2S1'S0, s.ise.i'S2S1'S0, sb.ise.i'SS1SS0, sb.i.SS1', mm.iSS1SS0', sb.ise.i'SS1'SS0', sb.i'se.iSS1'SS0', sb.ise.i'SS1'SS0', mmi's.iSs1SS0', sb.iu.RSS1'SS0, sb.iSS1SS0, mm.i's.iSs1SS0', sb.ise.i'SS1'SS0', sb.i'se.iSS1'SS0', and sb.iSS0 are represented by wavelengths $\lambda_0$ through $\lambda_{71}$ in the Circulating FIFO buffer optical state machine shown in FIG. 20 where Source Module 40 outputs are labeled from top to bottom as $\lambda_0$ to $\lambda_{71}$.

Wavelength $\lambda_0$ representing midterm d.RS2'S1S0 is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes m.o.

Wavelength $\lambda_1$ representing midterm se.id.RS2'S1S0' is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes m.0.

Wavelength $\lambda_2$ representing midterm se.iS2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes m.o.

Wavelength $\lambda_3$ representing midterm se.iS2S1'S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the bypass output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes m.o.

Wavelength $\lambda_4$ representing midterm s.iS2'S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the bypass input and out of the bypass output of the AND/BYPASS module controlled by S1; and to the through input and out of the non-complemented output of the AND/BYPASS module controlled by S0 to the input of the OR module which computes s.o.

Wavelength $\lambda_5$ representing midterm s.iS2'S1S0' is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes s.o.

Wavelength $\lambda_6$ representing midterm se.i'S2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes s.o.

Wavelength $\lambda_7$ representing midterm s.ise.iS2S1S0' is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes s.o.

Wavelength $\lambda_8$ representing midterm s.isb.iS2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes s.o.

Wavelength $\lambda_9$ representing midterm m.is.iS2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the non-complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes s.o.

Wavelength $\lambda_{10}$ representing midterm m.i's.isb.i'S2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the complemented output of the AND/BYPASS module controlled by se.i; to the through input and out of the complemented output of the AND/BYPASS module controlled by b.i; to the through input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes s.o.

Wavelength $\lambda_{11}$ representing midterm s.ise.i'S2S1'S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes s.o.

Wavelength $\lambda_{12}$ representing midterm m.i'b.iS2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the complemented output of the AND/BYPASS module controlled by S0 to the input of the OR module which computes s.o.

Wavelength $\lambda_{13}$ representing midterm S2'S1'S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the complemented output of the AND/BYPASS module controlled by S1; and to the through input and out of the complemented output of the AND/BYPASS module controlled by S0 to the input of the OR module which computes sb.o.

Wavelength $\lambda_{14}$ representing midterm S2'S1'S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the complemented output of the AND/BYPASS module controlled by S1; and to the through input and out of the complemented output of the AND/BYPASS module controlled by S0 to the input of the OR module which computes se.o.

Wavelength $\lambda_{15}$ representing midterm se.iS2'S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the bypass input and out of the bypass output of the AND/BYPASS module controlled by S1; and to the through input and out of the non-complemented output of the AND/BYPASS module controlled by S0 to the input of the OR module which computes se.o.

Wavelength $\lambda_{16}$ representing midterm m.i'se.iS2'S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the through input and out of the complemented output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes se.o.

Wavelength $\lambda_{17}$ representing midterm m.is.iS2'S1S0' is routed from the source module to the through bypass input and out of the bypass output of the AND/BYPASS module controlled by d.R; to the bypass input and out of the bypass output of the AND/BYPASS module controlled by u.R; to the input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the non-complemented output of the AND/BYPASS module controlled by m.i; to the through input and out of the complemented output of the AND/BYPASS module controlled by S2; to the through input and out of the non-complemented bypass output of the AND/BYPASS module controlled by S1; and to the through input and out of the complemented output of the AND/BYPASS module controlled by S0 to the input of the OR module which computes b.o.

Wavelength $\lambda_{18}$ representing midterm m.i'd.RS2'S1S0' is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the complemented output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes b.o.

Wavelength $\lambda_{19}$ representing midterm b.iS2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes b.o.

Wavelength $\lambda_{20}$ representing midterm sb.ib.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes b.o.

Wavelength $\lambda_{21}$ representing midterm m.i'sb.i'b.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes b.o.

Wavelength $\lambda_{22}$ representing midterm m.ib.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the non-complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes b.o.

Wavelength $\lambda_{23}$ representing midterm se.i'b.iS2S1'S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the complemented output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes b.o.

Wavelength $\lambda_{24}$ representing midterm d.RS2'S1'S0 is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented bypass output of the AND/BYPASS module controlled by S2; to the through input and out of the complemented bypass output of the AND/BYPASS module controlled by S1; and to the through input and out of the non-complemented output of the AND/BYPASS module controlled by S0 to the input of the OR module which computes d. T.

Wavelength $\lambda_{25}$ representing midterm m.is.iS2'S1S0' is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the non-complemented output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S2.

Wavelength $\lambda_{26}$ representing midterm S2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S2.

Wavelength $\lambda_{27}$ representing midterm sb.ib.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S2.

Wavelength $\lambda_{28}$ representing midterm s.isb.iS2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S2.

Wavelength $\lambda_{29}$ representing midterm m.i'sb.i'b.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S2.

Wavelength $\lambda_{30}$ representing midterm m.i's.isb.i'S2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S2.

Wavelength $\lambda_{31}$ representing midterm m.ib.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the non-complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S2.

Wavelength $\lambda_{32}$ representing midterm m.is.iS2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the non-complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S2.

Wavelength $\lambda_{33}$ representing midterm se.i'b.iS2S1'S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the complemented output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes S2.

Wavelength $\lambda_{34}$ representing midterm s.ise.i'S2S1'S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes S2.

Wavelength $\lambda_{35}$ representing midterm se.iS2S1'S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes S2.

Wavelength $\lambda_{36}$ representing midterm m.i'b.iS2S1'S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the complemented output of the AND/BYPASS module controlled by S0 to the input of the OR module which computes S2.

Wavelength $\lambda_{37}$ representing midterm d.RS2'S0 is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the bypass input and out of the bypass output of the AND/BYPASS module controlled by S1; and to the through input and out of the non-complemented output of the AND/BYPASS module controlled by S0 to the input of the OR module which computes S1.

Wavelength $\lambda_{38}$ representing midterm s.id.R'S2'S1S0 is routed from the source module to the through input and out of the complemented output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S1.

Wavelength $\lambda_{39}$ representing midterm se.id.R'S2'S1S0 is routed from the source module to the through input and out of the complemented bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented bypass output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S1.

Wavelength $\lambda_{40}$ representing midterm m.i'd.RS2'S1S0' is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the complemented output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S1.

Wavelength $\lambda_{41}$ representing midterm m.i'se.iS2'S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the through input and out of the complemented output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S1.

Wavelength $\lambda_{42}$ representing midterm s.iS2'S1S0' is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S1.

Wavelength $\lambda_{43}$ representing midterm S2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S1.

Wavelength $\lambda_{44}$ representing midterm sb.ib.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S1.

Wavelength $\lambda_{45}$ representing midterm s.isb.iS2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S1.

Wavelength $\lambda_{46}$ representing midterm m.i'sb.i'b.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the complemented bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S1.

Wavelength $\lambda_{47}$ representing midterm m.i's.isb.i'S2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the through input and out of the complemented output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S1.

Wavelength $\lambda_{48}$ representing midterm S2'S1'S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S0.

Wavelength $\lambda_{49}$ representing midterm d.RS2'S1'S0 is routed from the source module to the through input and out of the non-complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes S0.

Wavelength $\lambda_{50}$ representing midterm s.id.R'S2'S1S0 is routed from the source module to the through input and out of the complemented output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S0.

Wavelength $\lambda_{51}$ representing midterm se.id.R'S2'S0 is routed from the source module to the through input and out of the complemented output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the complemented output of the AND/BYPASS module controlled by S2; to the bypass input and out of the bypass output of the AND/BYPASS module controlled by S1; and to the through input and out of the non-complemented output of the AND/BYPASS module controlled by S0 to the input of the OR module which computes S0.

Wavelength $\lambda_{52}$ representing midterm se.iS2S1S0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the complemented output of the AND/BYPASS module controlled by S0 to the input of the OR module which computes S0.

Wavelength $\lambda_{53}$ representing midterm m.i'sb.i'b.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the complemented output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S0.

Wavelength $\lambda_{54}$ representing midterm m.i's.isb.i'S2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the complemented output of the AND/BYPASS module controlled by b.i; to the through input and out of the complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S0.

Wavelength $\lambda_{55}$ representing midterm m.ib.iS2S1S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the through input and out of the non-complemented output of the AND/BYPASS module controlled by b.i; to the through input and out of the non-complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S0.

Wavelength $\lambda_{56}$ representing midterm m.is.iS2S1S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the non-complemented output of the AND/BYPASS module controlled by m.i; to the through input and out of the non-complemented output of the AND/BYPASS module controlled by S2; to the through input and out of the non-complemented output of the AND/BYPASS module controlled by S1; and to the through input and out of the non-complemented output of the AND/BYPASS module controlled by S0 to the input of the OR module which computes S0.

Wavelength $\lambda_{57}$ representing midterm se.i'b.iS2S1'S0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the through input and out of the complemented output of the AND/BYPASS module controlled by se.i; to the through input and out of the non-complemented output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes S0.

Wavelength $\lambda_{58}$ representing midterm s.ise.i'S2S1'S0 is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by m.i; to the through input and out of the non-complemented output of the AND/BYPASS module controlled by S2; to the through input and out of the complemented output of the AND/BYPASS module controlled by S1; and to the through input and out of the non-complemented output of the AND/BYPASS module controlled by S0 to the input of the OR module which computes S0.

Wavelength $\lambda_{59}$ representing midterm sb.ise.i'SS1SS0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the non-complemented output of the AND/BYPASS module controlled by SS1; and to the through input and out of the non-complemented output of the AND/BYPASS module controlled by SS0 to the input of the OR module which computes mm.o.

Wavelength $\lambda_{60}$ representing midterm sb.iSS1' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the complemented output of the AND/BYPASS module controlled by SS1; and to the bypass input and out of the bypass output of the AND/BYPASS module controlled by SS0 to the input of the OR module which computes sb.o.

Wavelength $\lambda_{61}$ representing midterm mm.iSS1SS0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the non-complemented output of the AND/BYPASS module controlled by mm.i; to the through input and out of the non-complemented output of the AND/BYPASS module controlled by SS1; and to the through input and out of the complemented output of the AND/BYPASS module controlled by SS0 to the input of the OR module which computes sb.o.

Wavelength $\lambda_{62}$ representing midterm sb.ise.i'SS1'SS0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the complemented output of the AND/BYPASS module controlled by SS1; and to the through input and out of the complemented output of the AND/BYPASS module controlled by SS0 to the input of the OR module which computes u.T.

Wavelength $\lambda_{63}$ representing midterm sb.i'se.iSS1'SS0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the complemented output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the complemented output of the AND/BYPASS module controlled by SS1; and to the through input and out of the complemented output of the AND/BYPASS module controlled by SS0 to the input of the OR module which computes u.T.

Wavelength $\lambda_{64}$ representing midterm sb.ise.i'SS1SS0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the non-complemented output of the AND/BYPASS module controlled by SS1; and to the through input and out of the non-complemented output of the AND/BYPASS module controlled by SS0 to the input of the OR module which computes u.T.

Wavelength $\lambda_{65}$ representing midterm m.i's.iSs1SS0' is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the complemented output of the AND/BYPASS module controlled by mm.i; to the through input and out of the non-complemented output of the AND/BYPASS module controlled by SS1; and to the through input and out of the complemented output of the AND/BYPASS module controlled by SS0 to the input of the OR module which computes u.T.

Wavelength $\lambda_{66}$ representing midterm sb.iu.RSS1'SS0 is routed from the source module to the bypass input and out of the bypass output of the AND/BYPASS module controlled by d.R; to the through input and out of the non-complemented output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the complemented output of the AND/BYPASS module controlled by SS1; and to the through input and out of the non-complemented output of the AND/BYPASS module controlled by SS0 to the input of the OR module which computes SS1.

Wavelength $\lambda_{67}$ representing midterm sb.iSS1SS0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the non-complemented output of the AND/BYPASS module controlled by SS1; and to the through input and out of the non-complemented output of the AND/BYPASS module controlled by SS0 to the input of the OR module which computes SS1.

Wavelength $\lambda_{68}$ representing midterm m.i's.iSs1SS0' is routed from the source module to the bypass input and out of the bypass output of the AND/BYPASS module controlled by d.R; to the bypass input and out of the bypass output of the AND/BYPASS module controlled by u.R; to the through input and out of the non-complemented output of the AND/BYPASS module controlled by s.i; to the bypass input and out of the bypass output of the AND/BYPASS module controlled by sb.i; to the bypass input and out of the bypass output of the AND/BYPASS module controlled by se.i; to the bypass input and out of the bypass output of the AND/BYPASS module controlled by b.i; to the through input and out of the complemented output of the AND/BYPASS module controlled by mm.i; to the through input and out of the non-complemented output of the AND/BYPASS module controlled by SS1; and to the through input and out of the complemented output of the AND/BYPASS module controlled by SS0 to the input of the OR module which computes SS1.

Wavelength $\lambda_{69}$ representing midterm sb.ise.i'SS1'SS0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the through input and out of the complemented output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the complemented output of the AND/BYPASS module controlled by SS1; and to the through input and out of the complemented output of the AND/BYPASS module controlled by SS0 to the input of the OR module which computes SS0.

Wavelength $\lambda_{70}$ representing midterm sb.i'se.iSS1'SS0' is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the complemented output of the AND/BYPASS module controlled by sb.i; to the through input and out of the non-complemented output of the AND/BYPASS module controlled by se.i; to the bypass input and out of the bypass output of the AND/BYPASS module controlled by b.i; to the bypass input and out of the bypass output of the AND/BYPASS module controlled by mm.i; to the through input and out of the complemented output of the AND/BYPASS module controlled by SS1; and to the through input and out of the complemented output of the AND/BYPASS module controlled by SS0 to the input of the OR module which computes SS0.

Wavelength $\lambda_{71}$ representing midterm sb.iSS0 is routed from the source module to the bypass input and out of the bypass output of the AND/BYPASS module controlled by d.R; to the bypass input and out of the bypass output of the AND/BYPASS module controlled by u.R; to the bypass input and out of the bypass output of the AND/BYPASS module controlled by s.i; to the through input and out of the non-complemented output of the AND/BYPASS module controlled by sb.i; to the bypass input and out of the bypass output of the AND/BYPASS module controlled by se.i; to the bypass input and out of the bypass output of the AND/BYPASS module controlled by b.i; to the bypass input and out of the bypass output of the AND/BYPASS module controlled by mm.i; to the bypass input and out of the bypass output of the AND/BYPASS module controlled by SS1; and to the through input and out of the non-complemented output of the AND/BYPASS module controlled by SS0 to the input of the OR module which computes SS0.

While an optical Circulating FIFO Buffer is discussed; it is also possible to implement the Circulating FIFO Buffer with digital electronics where the combinatoric logic is implemented with electronic digital gates, the storage elements implemented with electronic shift registers, and the state bits also implemented with electronic shift registers.

While an optical Circulating FIFO Buffer is discussed; it is also possible to implement the Circulating FIFO Buffer with analog electronics where the combinatoric logic is implemented with single pole double throw (SPDT) electronically controlled switches; storage elements implemented by electronic transmission line based delay lines; and state bits also implemented by electronic transmission line based delay lines.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

I claim:

1. A buffer with
    a downstream input,
    a downstream output,
    an upstream input,
    an upstream output,
    a staging loop with a data storage capacity of X bits,
    a staging marker loop with the same storage capacity as the staging loop,
    a primary storage loop that
        stores a logical list with an end and a begin and
        has a data storage capacity greater than the storage loop,
    a storage begin marker loop with a storage capacity equal to the storage capacity of the primary storage loop that stores the begin of the logical list,
    a storage end marker loop with a storage capacity equal to the storage capacity of the primary storage loop that stores the end of the logical list,
    a output marker loop with a storage capacity equal to the staging loop,
    a first set of state storage loops, and
    a second set of state storage loops
    comprising:
        a first state machine connected to the downstream input,
            the downstream output,
            the staging loop,
            the primary storage loop,
            the storage begin marker loop,
            the storage end marker loop, and
            the first set of state storage loops
        that
            initializes the logical list,
            manages the staging loop,
            manages the transfer of X bits of data from the downstream input to the staging loop,
            manages the transfer said data from the staging loop to the end of the logic list, and
            manages the end of the logical list and
        a second state machine connected to
            the upstream input,
            the upstream output,
            the primary storage loop,
            the storage begin marker loop,
            the output marker loop, and
            the second set of state storage loops
        that
            transfers X bits of data from the begin of the logical list to the upstream output and
            manages the begin of the logical list.

2. A buffer as described in claim 1 where the first state machine is implemented with optics.

3. A buffer as described in claim 1 where the primary storage loop is implemented with optics.

4. A buffer as described in claim 1 where the primary storage loop has at least n*(X+1) bits of storage capacity where n is a positive integer.

5. A buffer as described in claim 1 where the first state machine is implemented with an optical source module, Sagnac AND/BYPASS modules, Sagnac OR modules, a Pipeline Delay module, a Supplemental Feedback Delay module, and an optical clock module.

6. A buffer as described in claim 1 where the first state machine and the primary storage loop is implemented with analog electronics.

7. A buffer as described in claim 1 where the first state machine and the primary storage loop is implemented with digital electronics.

8. A buffer with
   a downstream input,
   a downstream output,
   an upstream input, and
   an upstream output
comprising:
   a circulating staging storage with X bits of data storage capacity that is used as a circular input buffer;
   a circulating staging marker storage with the same storage capacity as the staging storage that is used to control the transfer of data from the downstream input and the;
   a circulating primary storage with a head, a tail, and a data storage capacity greater than the staging storage;
   a circulating output marker storage with the same storage capacity as the staging storage that is used to control the transfer of data from the primary storage to the upstream output;
   a first set of state bit storage used by the control means to control
      the initialization,
      downstream negotiations,
      downstream data transfer,
      unused capacity check, and
      enqueing;
   a second set of state bit storage used by the control means to control
      the primary storage non-empty check,
      upstream data transfer negotiations,
      dequeuing, and
      upstream data transfer; and
   a control means connected to
      the downstream input,
      the downstream output,
      the upstream input,
      the upstream output,
      the staging storage,
      the staging marker storage,
      the primary storage,
      the output marker storage,
      the first set of state bit storage, and
      the second set of state bit storage
   that
      initializes the primary storage;
      negotiates the transfer of downstream data using the downstream input and the downstream output,
      transfers X bits of data from the downstream input to the staging storage
         when the staging storage is empty or
         when the staging storage data has already been transferred to the primary storage,
      checks to see if the primary storage has at least X bits of unused capacity,
      enqueues the staging storage data to the tail of the primary storage
         when the primary storage has at least X bits of unused capacity,
      checks to see if the primary storage has at least X bits of data,
      negotiates the transfer of X bits of data using the upstream output and the upstream input,
      dequeues X bits of data from the head of the primary storage
         when the primary storage has at least X bits of data, and
      transfers said data from the primary storage to the upstream output.

9. A buffer as described in claim 8 where the circulating primary storage is a comprised of a circulating content storage, a circulating begin marker storage, and a circulating end storage.

10. A buffer as described in claim 8 where the circulating storage is optical.

11. A buffer as described in claim 8 where the control means is optical.

12. A buffer as described in claim 8 where the control means is implemented with an optical source module, Sagnac AND/BYPASS modules, Sagnac OR modules, a Pipeline Delay module, a Supplemental Feedback Delay module, and an optical clock module.

13. A buffer as described in claim 8 where the data storage capacity of the circulating primary storage is $n*(X+1)$ bits where n is a positive integer.

14. A buffer as described in claim 8 where the data transferred from the downstream input into the staging storage starts with a data-begin bit.

15. A buffer as described in claim 8 where the data transferred from the primary storage to the upstream output starts with a data-begin bit.

16. A buffer as described in claim 8 where the control means uses
   the staging marker storage to control the transfer of data from the downstream input to the staging storage,
   the staging marker storage to control the transfer of data from the staging storage to the primary storage, and
   the output marker storage to control the transfer of data from the primary storage to the upstream output.

17. A method of buffering with a buffer with
   inputs,
   outputs,
   a circulating staging storage with X bits of capacity,
   a circulating staging marker storage with the same storage capacity as the staging storage,
   a circulating primary storage with
      a head and
      a tail and
      a storage capacity greater than the staging storage,
   a circulating output marker storage with the same storage capacity as the staging storage, and
   a control means
comprising the steps:
   initializing the primary storage;
   negotiating the transfer of data from the downstream input to the staging storage,
   transferring X bits of data from the downstream input to the staging storage
      when the staging storage is empty or
      when the staging storage data has already been transferred to the primary storage,
   enqueuing the staging storage data to the tail of the primary storage
      when the primary storage has at least X bits of unused capacity,
   negotiating the upstream transfer of data, dequeuing X bits of data from the head of the primary storage
when the primary storage has at least X bits of data, and
transferring said data from the primary storage to the upstream output
whereby the circular bit order of the X bits of data is preserved.

18. A method of buffering as described in claim 17 wherein the steps of enqueuing and dequeuing are independent.

19. A method of buffering as described in claim 17 wherein the step of transferring data for the downstream input to the staging storage further includes waiting for a begin-data bit before transferring said data.

20. A method of buffering as described in claim 17 wherein the step of transferring said data from the primary storage to the upstream output further includes transferring a begin-data bit before transferring said data.

* * * * *